US008461238B2

(12) United States Patent
Kawato et al.

(10) Patent No.: US 8,461,238 B2
(45) Date of Patent: Jun. 11, 2013

(54) PROCESS FOR PRODUCING INTERNAL MOLD RELEASE AGENT FOR OPTICAL MATERIAL, INTERNAL MOLD RELEASE AGENT FOR OPTICAL MATERIAL, AND POLYMERIZABLE COMPOSITION INCLUDING THE SAME

(75) Inventors: Nobuo Kawato, Kurume (JP); Mamoru Tanaka, Fukuoka (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 13/505,781

(22) PCT Filed: Nov. 4, 2010

(86) PCT No.: PCT/JP2010/006492
§ 371 (c)(1),
(2), (4) Date: May 3, 2012

(87) PCT Pub. No.: WO2011/055540
PCT Pub. Date: May 12, 2011

(65) Prior Publication Data
US 2012/0225996 A1  Sep. 6, 2012

(30) Foreign Application Priority Data
Nov. 6, 2009 (JP) .................. 2009-255307

(51) Int. Cl.
C08K 5/523 (2006.01)
(52) U.S. Cl.
USPC ........................................ 524/141; 524/140
(58) Field of Classification Search
USPC ................................. 524/140, 141
See application file for complete search history.

(56) References Cited

U.S. PATENT DOCUMENTS

| 5,059,673 A | 10/1991 | Kanemura et al. |
| 5,084,545 A | 1/1992 | Nagata et al. |
| 5,608,115 A | 3/1997 | Okazaki et al. |
| 5,693,738 A | 12/1997 | Okazaki et al. |
| 2010/0234498 A1 | 9/2010 | Iwazumi et al. |

FOREIGN PATENT DOCUMENTS

| JP | 61-085453 | * | 5/1986 |
| JP | 61085453 A | | 5/1986 |
| JP | 2-167330 A | | 6/1990 |
| JP | 1789084 C | | 9/1993 |
| JP | 7-276381 A | | 10/1995 |
| JP | 2031181 C | | 3/1996 |
| JP | 8-208792 A | | 8/1996 |
| JP | 2621991 B2 | | 6/1997 |
| JP | 2668364 B2 | | 10/1997 |
| JP | 3444682 B2 | | 9/2003 |
| JP | 2008-255221 A | | 10/2008 |
| WO | WO 2007/105355 A | | 9/2007 |

OTHER PUBLICATIONS

International Search Report (PCT/ISA/210) issued on Feb. 22, 2011, by the Japanese Patent Office as the International Searching Authority for International Application No. PCT/JP2010/006492.
Office Action issued in corresponding Chinese Patent Application No. 201080049750.8 dated Mar. 12, 2013.

* cited by examiner

*Primary Examiner* — Peter Szekely
(74) *Attorney, Agent, or Firm* — Buchanan Ingersoll & Rooney PC

(57) ABSTRACT

The process for producing an internal mold release agent for an optical material of the present invention includes a step of heating, to a range of 80° C. to 140° C., a composition including (a) a phosphoric ester compound, and (b) an alcohol compound containing an aliphatic alcohol having 1 to 10 carbon atoms and/or aromatic alcohol, when the total amount of (a) and (b) is 100% by weight, the alcohol compound (b) is included in an amount equal to or more than 2.5% by weight.

20 Claims, No Drawings

PROCESS FOR PRODUCING INTERNAL MOLD RELEASE AGENT FOR OPTICAL MATERIAL, INTERNAL MOLD RELEASE AGENT FOR OPTICAL MATERIAL, AND POLYMERIZABLE COMPOSITION INCLUDING THE SAME

TECHNICAL FIELD

The present invention relates to a process for producing an internal mold release agent for an optical material, an internal mold release agent for an optical material, and a polymerizable composition including the same.

BACKGROUND ART

Plastic lenses are light-weight and hard to crack, and can be dyed, as compared with inorganic lenses, and accordingly, they have been rapidly spreading in optical elements such as spectacle lenses, camera lenses. Various resins for lenses have been developed and used so far, and typical examples thereof include a polythiourethane resin obtained from a polymerizable composition including a polythiol compound and a polyisocyanate compound (see Patent Documents 1 to 5).

In the case of producing a plastic lens including a polythiourethane resin by cast polymerization, an internal mold release agent which contains a phosphoric ester compound or the like may be added to a polymerizable composition in some cases in order to improve the releasability from a cast.

However, in the case of producing a plastic lens using an internal mold release agent including a phosphoric ester compound or the like, white turbidity may be observed in the resin in some cases. In Patent Document 6, it is reported that the white turbidity of the resin can be lessened by heating a mold release agent including a phosphoric ester compound to 80 to 150° C. However, even with the method described in Patent Document 6, the white turbidity of the resin could not be lessened in some cases.

RELATED DOCUMENT

Patent Document
[Patent Document 1] Japanese Patent No. 1789084
[Patent Document 2] Japanese Patent No. 2621991
[Patent Document 3] Japanese Patent No. 3444682
[Patent Document 4] Japanese Patent No. 2668364
[Patent Document 5] Japanese Patent No. 2031181
[Patent Document 6] Japanese Laid-open patent publication No. 7-276381

DISCLOSURE OF THE INVENTION

The present invention has been made in view of the above-described circumstances, and thus aims to provide a process for producing an internal mold release agent for an optical material, which has excellent releasability and is capable of inhibiting the problematic white turbidity of a resin in an optical material effectively; the internal mold release agent for an optical material; and a polymerizable composition including the same.

The present inventors have made an extensive investigation in order to overcome the above-described problems. As a result, they have obtained a finding that an anhydride or the like which is one of the components of a phosphoric ester compound has an influence on the white turbidity of a resin, and the compound is decomposed by a further reaction with an alcohol.

Based on the finding, the present inventors have made a further investigation, and as a result, they have found a process for producing an internal mold release agent for an optical material, in which the white turbidity of the resin is inhibited, and thus, the transparency of the resin can be improved, by producing a phosphoric ester-based composition including a predetermined amount of an alcohol compound, and heating the composition to a predetermined temperature, thereby completing the present invention.

That is, the present invention is given as follows:
[1] A process for producing an internal mold release agent for an optical material, including:
a step of heating a composition comprising (a) a phosphoric ester compound and (b) an alcohol compound containing an aliphatic alcohol having 1 to 10 carbon atoms and/or aromatic alcohol to a range of 80° C. to 140° C.,
wherein the composition contains the alcohol compound (b) in an amount equal to or more than 2.5% by weight based on the total amount of (a) and (b) is 100% by weight.
[2] The process for producing an internal mold release agent for an optical material as described in [1], further including a step of producing the composition before the heating step.
[3] The process for producing an internal mold release agent for an optical material as described in [1] or [2], wherein in the step of producing the composition, the alcohol compound (b) is added to the phosphoric ester compound (a).
[4] The process for producing an internal mold release agent for an optical material as described in any one of [1] to [3], wherein the alcohol compound (b) is an aliphatic alcohol having 4 to 10 carbon atoms.
[5] An internal mold release agent for an optical material obtained by the production method as described in any one of [1] to [4].
[6] A polythiourethane-based polymerizable composition including 0.05 to 0.4 parts by weight of the internal mold release agent for an optical material as described in [5], based on 100 parts by weight of the total amount of the iso(thio)cyanates and the active hydrogen compounds.
[7] The polythiourethane-based polymerizable composition as described in [6], wherein the ratio of the number of the functional groups composed of the mercapto groups and the hydroxyl groups in the active hydrogen compounds to the number of the functional groups composed of the isocyanate groups and the isothiocyanate groups in the iso(thio)cyanates is in the range of 0.8 to 1.2.
[8] The polythiourethane-based polymerizable composition as described in [6] or [7], wherein
the iso(thio)cyanates are one or more kinds of the compound(s) selected from m-xylylenediisocyanate, m-phenylenediisocyanate, 2,4-tolylenediisocyanate, 2,6-tolylenediisocyanate, 2,5-bis(isocyanatomethyl)-bicyclo[2.2.1]-heptane, 2,6-bis(isocyanatomethyl)-bicyclo[2.2.1]-heptane, 1,3-bis(isocyanatomethyl)cyclohexane, 1,4-bis(isocyanatomethyl)cyclohexane, and hexamethylenediisocyanate, and
the active hydrogen compounds are one or more kinds of the compound(s) selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 2,5-dimercaptomethyl-1,4-dithiane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane.

[9] A polythiourethane resin obtained by heating and curing the polymerizable composition as described in any one of [6] to [8].

[10] An optical material including the polythiourethane resin as described in [9].

[11] A plastic lens including the optical material as described in [10].

[12] A process for producing the polythiourethane resin, including subjecting the polymerizable composition as described in any one of [6] to [8] to cast polymerization.

According to the production method of the present invention, an internal mold release agent for an optical material, which has excellent releasability, and is capable of inhibiting the white turbidity of a resin and improving the transparency of the resin can be obtained. Such an internal mold release agent for an optical material is suitably used in a resin for various optical materials for which a high refractive index and high transparency are required.

DESCRIPTION OF EMBODIMENTS

Hereinafter, the present invention will be described in detail.

<Method for Producing Internal Mold Release Agent for Optical Material>

The process for producing an internal mold release agent for an optical material of the present invention involves heating, to a range of 80° C. to 140° C., a composition including (a) a phosphoric ester compound and (b) an alcohol compound containing an aliphatic alcohol having 1 to 10 carbon atoms and/or aromatic alcohol, when the total amount of (a) and (b) is 100% by weight, the alcohol compound (b) is included in an amount equal to or more than 2.5% by weight.

Specifically, the method includes the following steps.

Step a: A composition including (a) a phosphoric ester compound and (b) an alcohol compound containing an aliphatic alcohol having 1 to 10 carbon atoms and/or aromatic alcohol, when the total amount of (a) and (b) is 100% by weight, the alcohol compound (b) is included in an amount equal to or more than 2.5% by weight is produced.

Step b: The composition obtained in step a, in which the concentration of the alcohol compound (b) is adjusted to the above-described concentration, is heated to a range of 80° C. to 140° C.

Each of the steps will be described below.

(Step a)

The phosphoric ester compound (a) is a mixture including a phosphoric monoester and/or a phosphoric diester, and the like, containing an alkyl chain, an oxyethylene chain, or the like. Further, a phosphoric triester may be included therein. The phosphoric ester compound (a) is a compound exhibiting acidity.

The alkyl chain or the oxyethylene chain of the phosphoric ester in the preferable phosphoric ester compound (a) included in the internal mold release agent for an optical material has 1 to 20 carbon atoms, and preferably 1 to 10 carbon atoms from the viewpoint of compatibility in the polymerizable composition.

Examples of the phosphoric ester compound include Zelec UN manufactured by STEPAN Co., Ltd., JP series manufactured by Johoku Chemical Co., Ltd., Phosphanol series manufactured by Toho Chemical Industry Co., Ltd., AP and DP series manufactured by Daihachi Chemical Co., Ltd., and the like, which are commercially available. These commercially available products may include at least one kind of the alcohol compounds (b) as described later. Further, the alcohol compound (b) included in the commercially available product may be the same as or different from the alcohol compound (b) added. In addition, the commercially available product may include alcohol compounds other than the alcohol compound (b) within a scope not adversely affecting the effect of the present invention.

The alcohol compound (b) contains an aliphatic alcohol and/or aromatic alcohol having 1 to 10 carbon atoms. As the alcohol compound (b), an aliphatic alcohol having 1 to 10 carbon atoms is preferable, and an aliphatic alcohol having 4 to 10 carbon atoms is more preferable.

Examples of the aliphatic group of the aliphatic alcohol include an organic residue derived from a linear aliphatic compound, an organic residue derived from a branched aliphatic compound, an organic residue derived from a cyclic aliphatic compound, an organic residue derived from an aromatic compound, or the like.

Examples of the organic residue derived from a linear aliphatic compound include organic residues derived from methane, ethane, propane, butane, pentane, hexane, heptane, octane, nonane, decane, and the like.

Examples of the organic residue derived from a branched aliphatic compound include organic residues derived from 2-methylpropane, 2-methylbutane, 2-methylpentane, 3-methylpentane, 3-ethylpentane, 2-methylhexane, 3-methylhexane, 2-ethylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, 2-methyl-1-butene, 3-methyl-1-butene, 2-methyl-2-butene, 2-methyl-butadiene, 2,3-dimethylbutadiene, and the like.

Examples of the organic residue derived from a cyclic aliphatic compound include organic residues derived from cyclopentane, cyclopentene, cyclopentadiene, cyclohexane, 1,2-dimethylcyclohexane, 1,3-dimethylcyclohexane, 1,4-dimethylcyclohexane, cyclohexene, 1,3-cyclohexadiene, 1,4-cyclohexadiene, norbornane, 2,3-dimethylnorbornane, 2,5-dimethylnorbornane, 2,6-dimethylnorbornane, and the like.

Examples of the organic residue derived from an aromatic compound include organic residues derived from benzene, toluene, o-xylene, m-xylene, p-xylene, styrene, ethylbenzene, and the like, but are not limited to these exemplified organic resides.

Among these exemplified organic residues, the organic residue derived from a linear aliphatic compound, the organic residue derived from a branched aliphatic compound, and the organic residue derived from a cyclic aliphatic compound are preferred, and the organic residue derived from a linear aliphatic compound having 4 to 10 carbon atoms and the organic residue derived from a branched aliphatic compound are more preferred.

Examples of the alcohol compound (b) include a linear aliphatic alcohol compound, a branched aliphatic alcohol compound, a cyclic aliphatic alcohol compound, an aromatic alcohol compound, and the like.

Examples of the linear aliphatic alcohol compound include methanol, ethanol, 1-propanol, 1-butanol, 1-pentanol, 1-hexanol, 1-heptanol, 1-octanol, 1-nonanol, 1-decanol, 2-propanol, 2-butanol, 2-pentanol, 2-hexanol, 2-heptanol, 2-octanol, 2-nonanol, 2-decanol, 3-pentanol, 3-hexanol, 3-heptanol, 3-octanol, 3-nonanol, 3-decanol, 4-heptanol, 4-octanol, 4-nonanol, 4-decanol, 5-nonanol, 5-decanol, and the like.

Examples of the branched aliphatic alcohol compound include 2-methyl-1-propanol, t-butanol, 2-methyl-1-butanol, 2-methyl-2-butanol, 2-methyl-1-pentanol, 2-methyl-2-pentanol, 3-methyl-1-pentanol, 3-methyl-2-pentanol, 3-ethyl-1- pentanol, 3-ethyl-2-pentanol, 2-methyl-1-hexanol, 2-methyl-2-hexanol, 3-methyl-1-hexanol, 3-methyl-2-hexanol, 2-ethyl-1-hexanol, 2-ethyl-2-hexanol, 3-ethyl-1-hexanol, 3-ethyl-2-hexanol, 2-methyl-1-heptanol, 3-methyl-1-heptanol, 4-methyl-1-heptanol, 3-ethyl-1-heptanol, 4-ethyl-1-heptanol, 4-propyl-1-heptanol, 2-methyl-1-octanol, 2-methyl-2-octanol, 3-methyl-1-octanol, 3-methyl-2-octanol, 4-methyl-1-octanol, 3-ethyl-1-octanol, 4-ethyl-1-octanol, and the like.

Examples of the cyclic aliphatic alcohol compound include hydroxymethylcyclopentane, hydroxymethylcyclohexane, 1-hydroxymethyl-2,3-dimethylcyclohexane, 1-hydroxymethyl-2,4-dimethylcyclohexane, 1-hydroxymethyl-3,5-dimethylcyclohexane, 2-hydroxymethyl-norbornane, hydroxycyclopentane, hydroxycyclohexane, 1-hydroxy-2,3-dimethylcyclohexane, 1-hydroxy-2,4-dimethylcyclohexane, 1-hydroxy-3,5-dimethylcyclohexane, 2-hydroxy-norbornane, and the like.

Examples of the aromatic alcohol compound include hydroxymethylbenzene, 1-hydroxymethyl-2-methylbenzene, 1-hydroxymethyl-3-methylbenzene, 1-hydroxymethyl-4-methylbenzene, 1-hydroxymethyl-2,3-dimethylbenzene, 1-hydroxymethyl-2,4-dimethylbenzene, phenol, 2-methylphenol, 3-methylphenol, 4-methylphenol, 2,3-dimethylphenol, 2,4-dimethylphenol, and the like, but are not limited to these exemplified compounds.

Among these exemplified compounds, methanol, ethanol, 1-propanol, 1-butanol, 2-butanol, t-butanol, 1-pentanol, 1-hexanol, 1-octanol, 1-decanol, 2-methylpentanol, 3-methylpentanol, 4-methylpentanol, 2-ethylhexanol, 3-ethylhexanol, 2-methylheptanol, 3-methylheptanol, 4-methylheptanol, 3-ethylheptanol, 4-ethylheptanol, 2-methyloctanol, 3-methyloctanol, 4-methyloctanol, 5-methyloctanol, 6-methyloctanol, 3-ethyloctanol, and 4-ethyloctanol are more preferred, and 1-butanol, 2-butanol, t-butanol, 1-hexanol, 1-octanol, 1-decanol, and 2-ethylhexanol are even more preferable. These alcohol compounds may be used alone or in a mixture of two or more kinds thereof.

In step a, a composition including the phosphoric ester compound (a) and the alcohol compound (b) such that, when the total amount of the phosphoric ester compound (a) and the alcohol compound (b) is 100% by weight, the amount of the alcohol compound (b) is equal to or more than 2.5% by weight is produced.

The composition can be obtained, for example, by adding the alcohol compound (b) dropwise to the phosphoric ester compound (a), and mixing them without a solvent, or alternatively by adding the phosphoric ester compound (a) dropwise to the alcohol compound (b) and mixing them. Further, in the case where a commercially available product used as the phosphoric ester compound (a) includes the alcohol compound (b), the amount of the alcohol compound (b) included in the composition is the total amount of the alcohol compound (b) added and the alcohol compound (b) included in the commercially available product.

The content of the alcohol compound (b) in the composition is equal to or more than 2.5% by weight when the total amount of the phosphoric ester compound (a) and the alcohol compound (b) is 100% by weight. From the viewpoint of the reaction time, the content is preferably equal to or more than 6.1% by weight. Further, the upper limit is equal to or less than 20% by weight, and preferably equal to or less than 10% by weight, from the viewpoint of the cost of the alcohol added. These lower limit and upper limit may be suitably selected and combined together.

(Step b)

In step b, the composition having an adjusted concentration of the alcohol compound (b) obtained in step a is heated to a range of 80° C. to 140° C., thereby obtaining the internal mold release agent for an optical material of the present invention.

The heating step of the composition in step b can be carried out in the range of 80° C. to 140° C., preferably 80° C. to 130° C., and more preferably 80° C. to 120° C.

In step b, it is necessary to affect the alcohol compound (b) with an anhydride or the like which is one of the components of the phosphoric ester compound which has an influence on the white turbidity of a resin in the temperature range as described above. For this reason, step b can be carried out under the condition in which the heating is carried out at a heating temperature lower than the boiling point of the alcohol compound (b), or even at a temperature equal to or higher than the boiling point, step b can be carried out under the condition in which the alcohol compound (b) is prevented from being distilled off outside the reaction system by the use of a reflux condenser or the like.

Since the time for the heating treatment in step b varies depending on the type of the phosphoric ester compound (a) or the alcohol compound (b), the treatment temperature, or the like, the time cannot be defined simply, but it is any time equal to or more than 30 minutes, and from the viewpoint of work efficiency, it is preferably in a range of 30 minutes to 30 hours, more preferably in a range of 1 hour to 24 hours, and even more preferably in a range of 1 hour to 18 hours. By carrying out the heating step during the time as described above, an internal mold release agent for an optical material can be obtained efficiently.

The process for producing an internal mold release agent for an optical material of the present invention includes:

a step of producing a composition comprising (a) a phosphoric ester compound and (b) an alcohol compound containing an aliphatic alcohol having 1 to 10 carbon atoms and/or aromatic alcohol, in which the alcohol compound (b) is included in an amount equal to or more than 2.5% by weight, and preferably equal to or more than 6.1% by weight based on the total amount of (a) and (b) is 100% by weight, and a step of heating the composition to a range of 80° C. to 140° C., preferably 80° C. to 130° C., and more preferably 80° C. to 120° C.

Further, the numerical ranges above can be combined arbitrarily.

By using the internal mold release agent for an optical material obtained by heating the composition including the alcohol compound (b) in a predetermined amount to the above-described temperature range, the resin can be provided with good releasability and a white turbidity inhibiting effect. In addition, a polythiourethane resin having the same physical properties as those in the prior art can be obtained without affecting the physical properties of the polythiourethane resin.

<Polythiourethane-Based Polymerizable Composition and Polythiourethane Resin>

The polythiourethane-based polymerizable composition of the present invention includes iso(thio)cyanates, active hydrogen compounds, and the above-described internal mold release agent for an optical material.

The amount of the internal mold release agent used for an optical material of the present invention can be determined based on such an amount of the phosphoric ester compound (a) that exhibits the internal mold releasing effect. The phosphoric ester compound (a) can be used in an amount in the range of 0.05 to 0.4 parts by weight, based on 100 parts by weight of the total amount of the iso(thio)cyanates and the active hydrogen compounds. The amount used can be suitably determined according to the type and amount of the monomers or catalysts used, or the shape of a molded product.

With the polythiourethane-based polymerizable composition including the internal mold release agent for an optical material in an amount described above range, a polythiourethane resin having superior releasability and further inhibited white turbidity can be obtained. In addition, a polythiourethane resin having the same physical properties as those in the prior art can be obtained without affecting the physical properties of the polythiourethane resin.

In the present invention, the iso(thio)cyanates refer to compounds each having at least one isocyanato group and/or isothiocyanato group in the molecule. They are aliphatic or aromatic compounds which may contain an alkyl group, an aliphatic ring, or an aromatic ring. They may further contain a functional group other than the isocyanato group and the isothiocyanato group. In addition, they may contain a sulfur atom or the like in the molecule. In addition, they may contain a dimer, a trimer, or a prepolymer. The iso(thio)cyanates are preferably aliphatic or aromatic compounds each having 2 to 4 isocyanato groups and/or isothiocyanato groups, and more preferably aliphatic or aromatic compounds each having 2 to 3 isocyanato groups.

In the present invention, examples of the iso(thio)cyanates include an aliphatic isocyanate compound, an alicyclic isocyanate compound, an aromatic isocyanate compound, a sulfur-containing aliphatic isocyanate compound, a sulfur-containing aromatic isocyanate compound, a heterocyclic isocyanate compound, an aliphatic isothiocyanate compound, an alicyclic isothiocyanate compound, an aromatic isothiocyanate compound, a sulfur-containing aliphatic isothiocyanate compound, a sulfur-containing aromatic isothiocyanate compound, a heterocyclic isothiocyanate compound, and the like.

Examples of the aliphatic isocyanate compound include hexamethylenediisocyanate, 2,2-dimethylpentanediisocyanate, 2,2,4-trimethylhexanediisocyanate, butenediisocyanate, 1,3-butadiene-1,4-diisocyanate, 2,4,4-trimethylhexamethylenediisocyanate, 1,6,11-undecatriisocyanate, 1,3,6-hexamethylenetriisocyanate, 1,8-diisocyanato-4-isocyanatomethyloctane, bis(isocyanatoethyl)carbonate, bis(isocyanatoethyl)ether, and the like.

Examples of the alicyclic isocyanate compound include isophoronediisocyanate, 1,2-bis(isocyanatomethyl)cyclohexane, 1,3-bis(isocyanatomethyl)cyclohexane, 1,4-bis(isocyanatomethyl)cyclohexane, dicyclohexyl methanediisocyanate, cyclohexanediisocyanate, methylcyclohexanediisocyanate, dicyclohexyldimethylmethaneisocyanate, 2,2-dimethyldicyclohexylmethaneisocyanate, 2,5-bis(isocyanatomethyl)bicyclo[2,2,1]-heptane, 2,6-bis(isocyanatomethyl)bicyclo[2,2,1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, and the like.

Examples of the aromatic isocyanate compound include o-xylylenediisocyanate, m-xylylenediisocyanate, p-xylylenediisocyanate, bis(isocyanatoethyl)benzene, bis(isocyanatopropyl)benzene, α,α,α',α'-tetramethyl xylylenediisocyanate, bis(isocyanatobutyl)benzene, bis(isocyanatomethyl)naphthalene, bis(isocyanatomethyl)diphenyl ether, m-phenylenediisocyanate, p-phenylenediisocyanate, 2,4-tolylenediisocyanate, 2,6-tolylenediisocyanate, ethylphenylenediisocyanate, isopropylphenylenediisocyanate, dimethylphenylenediisocyanate, diethylphenylenediisocyanate, diisopropylphenylenediisocyanate, trimethylbenzenetriisocyanate, benzenetriisocyanate, biphenyldiisocyanate, toluidinediisocyanate, 4,4-diphenylmethanediisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, hexahydrobenzenediisocyanate, hexahydrodiphenylmethane-4,4-diisocyanate, and the like.

Examples of the sulfur-containing aliphatic isocyanate compound include bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatopropyl)disulfide, bis(isocyanatomethylthio)methane, bis(isocyanatoethylthio)methane, bis(isocyanatoethylthio)ethane, bis(isocyanatomethylthio)ethane, 1,5-diisocyanato-2-isocyanatomethyl-3-thiapentane, and the like.

Examples of the sulfur-containing aromatic isocyanate compound include diphenyl sulfide-2,4-diisocyanate, diphenyl sulfide-4,4-diisocyanate, 3,3-dimethoxy-4,4-diisocyanatodibenzylthioether, bis(4-isocyanatomethylbenzene)sulfide, 4,4-methoxybenzene thioethylene glycol-3,3-diisocyanate, diphenyl disulfide 4,4-diisocyanate, 2,2-dimethyldiphenyl disulfide 5,5-diisocyanate, 3,3-dimethyldiphenyl disulfide 5,5-diisocyanate, 3,3-dimethyldiphenyl disulfide 6,6-diisocyanate, 4,4-dimethyldiphenyl disulfide 5,5-diisocyanate, 3,3-dimethoxydiphenyl disulfide 4,4-diisocyanate, 4,4-dimethoxydiphenyl disulfide 3,3-diisocyanate, and the like.

Examples of the heterocyclic isocyanate compound include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl) tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanato-methyl)-1,3-dithiolane, 4,5-bis(isocyanatomethyl)-2-methyl-1,3-dithiolane, and the like, but are not limited to these exemplified compounds.

Examples of the aliphatic isothiocyanate compound include hexamethylenediisothiocyanate, 2,2-dimethylpentanediisothiocyanate, 2,2,4-trimethylhexanediisothiocyanate, butenediisothiocyanate, 1,3-butadiene-1,4-diisothiocyanate, 2,4,4-trimethylhexamethylenediisothiocyanate, 1,6,11-undecatriisothiocyanate, 1,3,6-hexamethylenetriisothiocyanate, 1,8-diisothiocyanato-4-isothiocyanatemethyloctane, bis(isothiocyanatoethyl)carbonate, bis(isothiocyanatoethyl)ether, and the like.

Examples of the alicyclic isothiocyanate compound include isophoronediisothiocyanate, 1,2-bis(isothiocyanatomethyl)cyclohexane, 1,3-bis(isothiocyanatomethyl)cyclohexane, 1,4-bis(isothiocyanatomethyl)cyclohexane, dicyclohexylmethanediisothiocyanate, cyclohexanediisothiocyanate, methylcyclohexanediisothiocyanate, dicyclohexyldimethylmethaneisothiocyanate, 2,2-dimethyldicyclohexylmethaneisothiocyanate, 2,5-bis(isothiocyanatomethyl)bicyclo[2,2,1]-heptane, 2,6-bis(isothiocyanatomethyl)bicyclo[2,2,1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, 4,9-bis(isothiocyanatomethyl)tricyclodecane, and the like.

Examples of the aromatic isothiocyanate compound include o-xylylenediisothiocyanate, m-xylylenediisothiocyanate, p-xylylenediisothiocyanate, bis(isothiocyanatoethyl)benzene, bis(isothiocyanatopropyl)benzene, α,α,α',α'-tetramethylxylylenediisothiocyanate, bis(isothiocyanatobutyl)benzene, bis(isothiocyanatomethyl)naphthalene, bis (isothiocyanatomethyl)diphenyl ether, phenylenediisothiocyanate, tolylenediisothiocyanate, ethylphenylenediisothiocyanate, isopropylphenylenediisothiocyanate, dimethylphenylenediisothiocyanate, diethylphenylenediisothiocyanate, diisopropylphenylenediisothiocyanate, trimethylbenzenetriisothiocyanate, benzenetriisothiocyanate, biphenyldiisothiocyanate, toluidinediisothiocyanate, 4,4-diphenylmethanediisothiocyanate, 3,3-dimethyldiphenylmethane-4,4-diisothiocyanate, bibenzyl-4,4-diisothiocyanate, bis(isothiocyanatophenyl)ethylene, 3,3-dimethoxybiphenyl-4,4-diisothiocyanate, phenylisothiocyanatoethylisocyanate, hexahydrobenzenediisothiocyanate, hexahydrodiphenylmethane-4,4-diisothiocyanate, and the like.

Examples of the sulfur-containing aliphatic isothiocyanate compound include bis(isothiocyanatoethyl)sulfide, bis(isothiocyanatopropyl)sulfide, bis(isothiocyanatohexyl)sulfide, bis(isothiocyanatomethyl)sulfone, bis(isothiocyanatomethyl)disulfide, bis(isothiocyanatopropyl)disulfide, bis(isothiocyanatomethylthio)methane, bis(isothiocyanatoethylthio)methane, bis(isothiocyanatoethylthio)ethane, bis(isothiocyanatomethylthio)ethane, 1,5-diisothiocyanato-2-isothiocyanatomethyl-3-thiapentane, and the like.

Examples of the sulfur-containing aromatic isothiocyanate compound include diphenyl sulfide-2,4-diisothiocyanate, diphenyl sulfide-4,4-diisothiocyanate, 3,3-dimethoxy-4,4-diisothiocyanatodibenzylthioether, bis(4-isothiocyanatomethylbenzene)sulfide, 4,4-methoxybenzene thioethylene glycol-3,3-diisothiocyanate, diphenyl disulfide 4,4-diisothiocyanate, 2,2-dimethyldiphenyl disulfide 5,5-diisothiocyanate, 3,3-dimethyldiphenyl disulfide 5,5-diisothiocyanate, 3,3-dimethyldiphenyl disulfide 6,6-diisothiocyanate, 4,4-dimethyldiphenyl disulfide 5,5-diisothiocyanate, 3,3-dimethoxydiphenyl disulfide 4,4-diisothiocyanate, 4,4-dimethoxydiphenyl disulfide 3,3-diisothiocyanate, and the like.

Examples of the heterocyclic isothiocyanate compound include 2,5-diisothiocyanatothiophene, 2,5-bis(isothiocyanatomethyl)thiophene, 2,5-diisothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, 4,5-bis(isothiocyanatomethyl)-1,3-dithiolane, 4,5-bis(isothiocyanatomethyl)-2-methyl-1,3-dithiolane, and the like, but are not limited to these exemplified compounds.

Among these exemplified compounds, the aliphatic isocyanate compounds, the alicyclic isocyanate compounds, and the aromatic isocyanate compounds are preferred, and m-xylylenediisocyanate, m-phenylenediisocyanate, 2,4-tolylenediisocyanate, 2,6-tolylenediisocyanate, 2,5-bis(isocyanatomethyl)-bicyclo[2.2.1]-heptane, 2,6-bis(isocyanatomethyl)-bicyclo[2.2.1]-heptane, 1,3-bis(isocyanatomethyl)cyclohexane, 1,4-bis(isocyanatomethyl)cyclohexane, and hexamethylenediisocyanate are more preferred. These iso(thio)cyanates may be used alone or in a mixture of two or more kinds thereof.

In the present invention, the active hydrogen compounds refer to compounds each having at least one hydroxyl group and/or mercapto group in the molecule. They are aliphatic or aromatic compounds which may contain an alkyl group, an aliphatic ring, or an aromatic ring. They may further contain a functional group other than the hydroxyl group and the mercapto group. Further, they may contain a sulfur atom or the like in the molecule. The iso(thio)cyanates are preferably aliphatic or aromatic compounds each having 2 to 4 hydroxyl groups and/or mercapto groups, and more preferably aliphatic or aromatic compounds each having 2 to 4 mercapto groups.

In the present invention, examples of the active hydrogen compounds include an aliphatic thiol compound, an aromatic thiol compound, an aliphatic thiol compound containing an ester bond, a heterocyclic thiol compound, a thiol compound having a dithioacetal or dithioketal skeleton, a thiol compound having an orthotrithioformate skeleton, a thiol compound having a hydroxyl group, an alcohol compound, and the like.

Examples of the aliphatic thiol compound include methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, 1,2-dimercaptopropylmethylether, 2,3-dimercaptopropylmethylether, 2,2-bis(mercaptomethyl)-1,3-propanedithiol, bis(2-mercaptoethyl)ether, tetrakis(mercaptomethyl)methane, bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl 2,5-dimethyl-1,4-dithiane, and the like.

Examples of the aliphatic thiol compounds containing an ester bond include 2,3-dimercaptosuccinic acid(2-mercaptoethyl ester), thiomalic acid bis(2-mercaptoethyl ester), 2,3-dimercapto-1-propanol(2-mercaptoacetate), 2,3-dimercapto-1-propanol(3-mercaptopropionate), 3-mercapto-1,2-propanediol di(2-mercaptoacetate), 3-mercapto-1,2-propanediol di(3-mercaptopropionate), diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerin tris(2-mercaptoacetate), glycerin tris(3-mercaptopropionate), 1,4-cyclohexanediol bis(2-mercaptoacetate) and 1,4-cyclohexanediol bis(3-mercaptopropionate); these thioglycolic and mercaptopropionic acid ester, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3- mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(3-mercaptopropionate), thiodiglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester), thiodipropionic acid bis(2,3-dimercaptopropyl ester), dithiodipropionic acid bis(2,3-dimercaptopropyl ester), and the like.

Examples of the aromatic thiol compound include 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 2,5-toluenedithiol, 3,4-toluenedithiol, 1,3-di(p-methoxy phenyl)propane-2,2-dithiol, 1,3-diphenylpropane-2,2-dithiol, phenylmethane-1,1-dithiol, 2,4-di(p-mercaptophenyl)pentane, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-dichlorobenzene-1,3-dithiol, 1,3-di(p-chlorophenyl)propane-2,2-dithiol, 3,4,5-tribromo-1,2-dimercaptobenzene, 2,3,4,6-tetrachlor-1,5-bis(mercaptomethyl)benzene, and the like.

Examples of the heterocyclic thiol compound include 2-methylamino-4,6-dithiol sym-triazine, 2-ethylamino-4,6-dithiol sym-triazine, 2-amino-4,6-dithiol sym-triazine, 2-morpholino-4,6-dithiol sym-triazine, 2-cyclohexylamino-4,6-dithiol sym-triazine, 2-methoxy-4,6-dithiol sym-triazine, 2-phenoxy-4,6-dithiol sym-triazine, 2-thiobenzeneoxy-4,6-dithiol sym-triazine, 2-thiobutyloxy-4,6-dithiol sym-triazine, 3,4-thiophenedithiol, and bismuth thiol.

Examples of the thiol compound having a dithioacetal or dithioketal skeleton include 1,1,3,3-tetrakis(mercaptomethylthio)propane, 1,1,2,2-tetrakis(mercaptomethylthio)ethane, 4,6-bis(mercaptomethylthio)-1,3-dithiane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethane thiol, 2-(4,5-dimercapto-2-thiapentyl)-1,3-dithiacyclopentane, 2,5-bis(4,4-bis(mercaptomethylthio)-2-thiabutyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 3-mercaptomethylthio-1,6-dimercapto-2,5-dithiahexane, 2-(2,2-bis(mercaptomethylthio)ethyl)-1,3-dithietane, 1,1,9,9-tetrakis(mercaptomethylthio)-5-(3,3-bis(mercaptomethylthio)-1-thiapropyl)-3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabutyl)methane, 3,5,9,11-tetrakis(mercaptomethylthio)-1,13-dimercapto-2,6,8,12-tetrathiamidecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercapto methylthio)-1,17-dimercapto-2,6,8,10,12,16-hexathiaheptadecane, 3,4,8,9-tetrakis(mercaptomethylthio)-1,11-dimercapto-2,5,7,10-tetrathiaundecane, 3,4,8,9,13,14-hexakis(mercaptomethylthio)-1,16-dimercapto-2,5,7,10,12,15-hexathiahexadecane, 8-[bis(mercaptomethylthio)methyl]-3,4,12,13-tetrakis(mercaptomethylthio)-1,15-dimercapto-2,5,7,9,11,14-hexathiapentadecane, 4,6-bis[3,5-bis(mercaptomethylthio)-7-mercapto-2,6-dithiaheptylthio]-1,3-dithiane, 4-[3,5-bis(mercaptomethylthio)-7-mercapto-2,6-dithiaheptylthio]-6-mercaptomethylthio-1,3-dithiane, 1,1-bis[4-(6-mercaptomethylthio)-1,3-dithianylthio]-1,3-bis(mercaptomethylthio)propane, 1-[4-(6-mercaptomethylthio)-1,3-dithianylthio]-3-[2,2-bis(mercaptomethylthio)ethyl]-7,9-bis(mercaptomethylthio)-2,4,6,10-tetrathiaundecane, 1,5-bis[4-(6-mercaptomethylthio)-1,3-dithianylthio]-3-[2-(1,3-dithietanyl)]methyl-2,4-dithiapentane, 4,6-bis{3-[2-(1,3-dithietanyl)]methyl-5-mercapto-2,4-dithiapentylthio}-1,3-dithiane, 4,6-bis[4-(6-mercaptomethylthio)-1,3-dithianylthio]-6-[4-(6-mercaptomethylthio)-1,3-dithianylthio]-1,3-dithiane, 3-[2-(1,3-dithietanyl)]methyl-7,9-bis(mercaptomethylthio)-1,11-dimercapto-2,4,6,10-tetrathiaundecane, 9-[2-(1,3-dithietanyl)]methyl-3,5,13,15-tetrakis(mercaptomethylthio)-1,17-dimercapto-2,6,8,10,12,16-hexathiaheptadecane, 3-[2-(1,3-dithietanyl)]methyl-7,9,13,15-tetrakis(mercaptomethylthio)-1,17-dimercapto-2,4,6,10,12,16-hexathiaheptadecane, 3,7-bis[2-(1,3-dithietanyl)]methyl-1,9-dimercapto-2,4,6,8-tetrathianonane, 4-[3,4,8,9-tetrakis(mercaptomethylthio)-11-mercapto-2,5,7,10-tetrathiaundecyl]-5-mercaptomethylthio-1,3-dithiolane, 4,5-bis[3,4-bis(mercaptomethylthio)-6-mercapto-2,5-dithiahexylthio]-1,3-dithiolane, 4-[3,4-bis(mercaptomethylthio)-6-mercapto-2,5-dithiahexylthio]-5-mercaptomethylthio-1,3-dithiolane, 4-[3-bis(mercaptomethylthio)methyl-5,6-bis(mercaptomethylthio)-8-mercapto-2,4,7-trithiaoctyl]-5-mercaptomethylthio-1,3-dithiolane, 2-{bis[3,4-bis(mercaptomethylthio)-6-mercapto- 2,5-dithiahexylthio]methyl}-1,3-dithietane, 2-[3,4-bis(mercaptomethylthio)-6-mercapto-2,5-dithiahexylthio]mercaptomethylthiomethyl-1,3-dithietane, 2-[3,4,8,9-tetrakis(mercaptomethylthio)-11-mercapto-2,5,7,10-tetrathiaundecylthio]mercaptomethylthiomethyl-1,3-dithietane, 2-[3-bis(mercaptomethylthio)methyl-5,6-bis(mercaptomethylthio)-8-mercapto-2,4,7-trithiaoctyl]mercapto methylthiomethyl-1,3-dithietane, 4,5-bis{1-[2-(1,3-dithietanyl)]-3-mercapto-2-thiapropylthio}-1,3-dithiolane, 4-{1-[2-(1,3-dithietanyl)]-3-mercapto-2-thiapropylthio}-5-[1,2-b is(mercaptomethylthio)-4-mercapto-3-thiabutylthio]-1,3-dithiolane, 2-{bis[4-(5-mercaptomethylthio-1,3-dithiolanyl)thio]methyl}-1,3-dithietane, 4-[4-(5-mercaptomethylthio-1,3-dithiolanyl)thio]-5-{1-[2-(1,3-dithietanyl)]-3-mercapto-2-thiapropylthio}-1,3-dithiolane, and oligomers thereof, and the like.

Examples of the thiol compound having an orthotrithioformate skeleton include tris(mercaptomethylthio)methane, tris (mercaptoethylthio)methane, 1,1,5,5-tetrakis(mercaptomethylthio)-2,4-dithiapentane, bis[4,4-bis(mercaptomethylthio)-1,3-dithiabutyl]-(mercaptomethylthio)methane, tris[4,4-bis(mercaptomethylthio)-1,3-dithiabutyl]methane, 2,4,6-tris(mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris[(4-mercaptomethyl-2,5-dithiacyclohexyl-1-yl)methylthio]methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacyclopentane, tris[2,2-bis(mercaptomethylthio)-2-thiapropyl]methane, tris[4,4-bis(mercaptomethylthio)-3-thiabutyl]methane, 2,4,6-tris[3,3-bis(mercaptomethylthio)-2-thiapropyl]-1,3,5-trithiacyclohexane, tetrakis[3,3-bis(mercaptomethylthio)-2-thiapropyl]methane, oligomers thereof, and the like.

Examples of the thiol compound having a hydroxyl group include 2-mercaptoethanol, 3-mercaptopropanol, 4-mercaptobutanol, 5-mercaptopentanol, 6-mercaptohexanol, 7-mercaptoheptanol, 8-mercaptooctanol, 5-mercapto-3-thiapentanol, and the like.

Examples of the alcohol compound include diethylene glycol, triethylene glycol, 1,3-propanediol, dipropylene glycol, tripropylene glycol, 1,4-butanediol, 1,3-butanediol, 1,5-pentanediol, 1,4-pentanediol, 1,3-pentanediol, 1,6-hexanediol, 1,5-hexanediol, 1,4-hexanediol, 1,3-hexanediol, 1,7-heptanediol, 1,8-octanediol, thiodiethanol, dithiodiethanol, thiodipropanol, dithiodipropanol, oligomers thereof, and the like, but are not limited to these exemplified compounds.

Among these exemplified compounds, the aliphatic thiol compounds, the aliphatic thiol compounds each containing an ester bond, the thiol compounds each having a dithioacetal or dithioketal skeleton, the thiol compounds each having an orthotrithioformate skeleton, the thiol compounds each having a hydroxyl group, and the alcohol compounds are preferred, and 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis(mercaptodimethylthio)ethyl)-1,3-dithietane, diethylene glycol, triethylene glycol, 1,3-propanediol, 1,4-butanediol, and 1,6-hexanediol are more preferred. These active hydrogen compounds may be used alone or in a mixture of two or more kinds thereof.

In the present invention, the ratio of the number of the functional groups of the mercapto groups and the hydroxyl groups in the active hydrogen compounds to the number of the functional groups of the isocyanate groups and the isothiocyanate groups in the iso(thio)cyanates is in the range of 0.8 to 1.2, preferably in the range of 0.85 to 1.15, and more preferably in the range of 0.9 to 1.1. Within the above-described range, a resin that is suitably used as a material for an optical material, particularly a spectacle plastic lens can be obtained.

By satisfying the above-described condition, a polythiourethane resin having the same refractive index, Abbe number, or the like as that of the polythiourethane resin in the prior art is obtained.

Furthermore, a resin modifier can be added for the purpose of controlling the optical properties, controlling various physical properties such as impact resistance, specific density of the resulting resin, and adjusting the handleability of the monomers.

In the present invention, examples of the resin modifier include an episulfide compound, an amine compound, an epoxy resin, an organic acid and an anhydride thereof, and olefin compounds including a (meth)acrylate compound, and the like. Examples of the amine compound that can be added as a resin modifier include a monofunctional primary amine compound, a primary polyamine compound, a monofunctional secondary amine compound, a secondary polyamine compound, and the like.

Examples of the episulfide compound include chained aliphatic β-epithiopropylthio compounds such as bis(β-epithiopropyl)sulfide, bis(β-epithiopropyl)disulfide, bis(β-epithiopropylthio)methane, 1,2-bis(β-epithiopropylthio)ethane, 1,2-bis(β-epithiopropylthio)propane, 1,3-bis(β-epithiopropylthio)propane, 1,3-his(β-epithiopropylthio)-2-methylpropane, 1,4-bis(β-epithiopropylthio)butane, 1,4-bis(β-epithiopropylthio)-2-methylbutane, 1,3-bis(β-epithiopropylthio)butane, 1,5-bis(β-epithiopropylthio)pentane, 1,5-bis(β-epithiopropylthio)-2-methylpentane, 1,5-bis(β-epithiopropylthio)-3-thiapentane, 1,6-bis(β-epithiopropylthio)hexane, 1,6-bis(β-epithiopropylthio)-2-methylhexane, 3,8-bis(β-epithiopropylthio)-3,6-trithioctane, 1,2,3-tris(β-epithiopropylthio)propane, 2,2-bis(β-epithiopropylthio)-1,3-bis(β-epithiopropylthiomethyl)propane, 2,2-bis(β-epithiopropylthiomethyl)-1-(β-epithiopropylthio) butane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thia hexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,5-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,1,1-tris[{2-(β-epithiopropylthio)ethyl}thiomethyl]-2-(β-epithiopropylthio)ethane, 1,1,2,2-tetrakis[{2-(β-epithiopropylthio)ethyl}thiomethyl]ethane, 1,11-bis(β-epithiopropylthio)-4,8-bis(β-epithiopropylthiomethyl)-3,6,9-trithiaundecane, 1,11-bis(β-epithiopropylthio)-4,7-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, and the like;

cyclic aliphatic β-epithiopropylthio compounds such as 1,3-bis(β-epithiopropylthio)cyclohexane, 1,4-bis(β-epithiopropylthio)cyclohexane, 1,3-bis(β-epithiopropylthiomethyl)cyclohexane, 1,4-bis(β-epithiopropylthiomethyl)cyclohexane, 2,5-bis(β-epithiopropylthiomethyl)-1,4-dithiane, 2,5-bis[{2-(β-epithiopropylthio)ethyl}thiomethyl]-1,4-dithiane, and the like; aromatic β-epithiopropylthio compounds such as 1,3-bis(β-epithiopropylthio)benzene, 1,4-bis(β-epithiopropylthio)benzene, 1,3-bis(β-epithiopropylthiomethyl)benzene, 1,4-bis(β-epithiopropylthiomethyl)benzene, bis{4-(β-epithiopropylthio)phenyl}methane, 2,2-bis{4-(β-epithiopropylthio)phenyl}propane, bis{4-(β-epithiopropylthio)phenyl}sulfide, bis{4-(β-epithiopropylthio)phenyl}sulfone, 4,4'-bis(β-epithiopropylthio)biphenyl, and the like; etc.

Examples of the monofunctional primary amine compound include ethylamine, n-propylamine, isopropylamine, n-butylamine, sec-butylamine, tert-butylamine, pentylamine, hexylamine, heptylamine, octylamine, decylamine, laurylamine, myristylamine, 3-pentylamine, 2-ethylhexylamine, 1,2-dimethylhexylamine, allylamine, aminomethylbicycloheptane, cyclopentylamine, cyclohexylamine, 2,3-dimethylcyclohexylamine, aminomethylcyclohexane, aniline, benzylamine, phenethylamine, 2,3- or 4-methylbenzylamine, o-, m-, or p-methylaniline, o-, m-, or p-ethylaniline, aminomorpholine, naphthylamine, furfurylamine, α-aminodiphenylmethane, toluidine, aminopyridine, aminophenol, aminoethanol, 1-aminopropanol, 2-aminopropanol, aminobutanol, aminopentanol, aminohexanol, methoxyethylamine, 2-(2-aminoethoxy)ethanol, 3-ethoxypropylamine, 3-propoxypropylamine, 3-butoxypropylamine, 3-isopropoxypropylamine, 3-isobutoxypropylamine, 2,2-diethoxyethylamine, and the like.

Examples of the primary polyamine compound include ethylenediamine, 1,2- or 1,3-diaminopropane, 1,2-, 1,3-, or 1,4-diaminobutane, 1,5-diaminopentane, 1,6-diaminohexane, 1,7-diaminoheptane, 1,8-diaminooctane, 1,10-diaminodecane, 1,2-, 1,3-, or 1,4-diaminocyclohexane, o-, m-, or p-diaminobenzene, 3,4- or 4,4'-diaminobenzophenone, 3,4- or 4,4'-diaminodiphenyl ether, 4,4'-diaminodiphenylmethane, 4,4'-diaminodiphenyl sulfide, 3,3'- or 4,4'-diaminodiphenyl sulfone, 2,7-diaminofluorene, 1,5-, 1,8-, or 2,3-diaminonaphthalene, 2,3-, 2,6-, or 3,4-diaminopyridine, 2,4- or 2,6-diaminotoluene, m- or p-xylylenediamine, isophoronediamine, diaminomethylbicycloheptane, 1,3- or 1,4-diaminomethylcycohexane, 2- or 4-aminopiperidine, 2- or 4-aminomethylpiperidine, 2- or 4-aminoethylpiperidine, N-aminoethylmorpholine, N-aminopropylmorpholine, and the like.

Examples of the monofunctional secondary amine compound include diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, morpholine, and the like.

Examples of the secondary polyamine compound include N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, tetramethylguanidine, and the like, but are not limited to these exemplified compounds. These amine compounds may be used alone or in a mixture of two or more kinds thereof.

Examples of the epoxy resin which can be added as a resin modifier include phenolic epoxy compounds obtained by the condensation reaction of a polyphenol compound such as bisphenol A glycidyl ether and the like with an epihalohydrin compound; alcoholic epoxy compounds obtained by the condensation of a polyhydric alcohol compound such as hydrogenated bisphenol A glycidyl ether and the like with an epihalohydrin compound; glycidyl ester-based epoxy compounds obtained by the condensation of a polyvalent organic acid compound such as 3,4-epoxycyclohexylmethyl-3',4'-epoxycyclohexane carboxylate, 1,2-hexahydrophthalic diglycidyl ester, and the like with an epihalohydrin compound; amine-based epoxy compounds obtained by the condensation of a primary and secondary diamine compound with an epihalohydrin compound; aliphatic polyvalent epoxy compounds such as vinylcyclohexene diepoxide and the like; etc., but are not limited to these exemplified compounds. These epoxy resins may be used alone or in a mixture of two or more kinds thereof.

Examples of the organic acid and an anhydride thereof which can be added as a resin modifier include thiodiglycolic acid, thiodipropionic acid, dithiodipropionic acid, phthalic anhydride, hexahydrophthalic anhydride, methylhexahydrophthalic anhydride, methyltetrahydrophthalic anhydride, methyl norbornene acid anhydride, methyl norbornane anhydride, maleic acid anhydride, trimellitic anhydride, pyromellitic anhydride and the like, but are not limited to these exemplified compounds. These organic acids and anhydrides thereof may be used alone or in a mixture of two or more kinds thereof.

Examples of the olefin compound including (meth)acrylate compounds and the like, which can be added as a resin modifier, include a (meth)acrylate compound, an allyl compound, a vinyl compound, and the like.

Examples of the (meth)acrylate compound include benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, 2,2-bis(4-acloxyethoxyphenyl)propane, 2,2-bis(4-methacloxyethoxyphenyl)propane, 2,2-bis(4-acloxydiethoxyphenyl)propane, 2,2-bis(4-methacloxydiethoxyphenyl)propane, bisphenol F diacrylate, bisphenol F dimethacrylate, 1,1-bis(4-acloxyethoxyphenyl)methane, 1,1-bis(4-methacloxyethoxyphenyl)methane, 1,1-bis(4-acloxydiethoxyphenyl)

methane, 1,1-bis(4-methacloxydiethoxyphenyl)methane, dimethyloltricyclodecane diacrylate, trimethylolpropane triacrylate, trimethylolpropane trimethacrylate, glycerol diacrylate, glycerol dimethacrylate, pentaerythritol triacrylate, pentaerythritol tetracrylate, pentaerythritol tetramethacrylate, methylthio acrylate, methylthio methacrylate, phenylthio acrylate, benzylthio methacrylate, xylylenedithiol diacrylate, xylylenedithiol dimethacrylate, mercaptoethyl sulfide diacrylate, mercaptoethyl sulfide dimethacrylate, and the like.

Examples of the allyl compound include allyl glycidyl ether, diallyl phthalate, diallyl terephthalate, diallyl isophthalate, diallyl carbonate, diethylene glycol bisallyl carbonate, and the like.

Examples of the vinyl compound include styrene, chlorostyrene, methylstyrene, bromostyrene, dibromostyrene, divinylbenzene, 3,9-divinylspirobi(m-dioxane), and the like, but are not limited to these exemplified compounds. These olefin compounds may be used alone or in a mixture of two or more kinds thereof.

The production of a polymerizable composition by mixing the iso(thio)cyanates, the active hydrogen compounds, the internal mold release agent for an optical material, the catalyst, and other additives is usually carried out at a temperature equal to or lower than 25° C. From the viewpoint of the pot life of the composition, the temperature is preferably further lower in some cases. However, in the case where the internal mold release agent for an optical material, the catalyst, or the additives are less soluble in monomers, they can be dissolved in the iso(thio)cyanates or the active hydrogen compounds that are monomers, or the resin modifier by warming in advance.

The process for producing a polythiourethane resin of the present invention is not particularly limited, but the production method is preferably cast polymerization, in which a polymerizable composition is injected in a mold which is held with a gasket or a tape or the like. At this time, depending on the desired properties of the obtained plastic lens, if needed, it is often preferable to carry out a degassing treatment under reduced pressure or a filtration under pressure or reduced pressure, or the like.

The polymerization conditions are not limited since they vary greatly depending on the type and the amount of the polymerizable composition and the catalyst used, the shape of a mold, or the like. However, the polymerization is carried out at a temperature of −50 to 150° C. over 1 to 50 hour(s). It is preferable to keep or gradually raise the temperature in a range of 10 to 150° C., and cure over 1 to 25 hour(s) in some cases.

For the polythiourethane resin of the present invention, if needed, treatments such as annealing and the like may be carried out. The treatment is normally carried out at a temperature between 50 and 150° C., preferably between 90 and 140° C., and more preferably between 100 and 130° C.

In the present invention, during molding of the polythiourethane resin, various additives such as a chain extender, a crosslinking agent, a photostabilizer, an ultraviolet absorber, an antioxidant, a discoloration-preventing agent, an oil soluble dye, a filler, an adhesiveness-improving agent, and the like may be added, depending on the purposes as in a known molding method.

The polythiourethane resin of the present invention can be obtained as molded products in various shapes by changing the mold upon cast polymerization. The polythiourethane resin of the present invention has a high refractive index and high transparency by using the above-described internal mold release agent for an optical material, and can thus be used for various purposes as a resin for optical use such as a spectacle lens, a camera lens and a light-emitting diode (LED), a prism, an optical fiber, an information recording substrate, a filter, a light-emitting diode, and the like. In particular, it is suitable as an optical material for a plastic lens, a camera lens, a light-emitting diode, or the like, or as an optical element.

A plastic lens using the polythiourethane resin of the present invention may be used, if needed, by providing a coating layer on one side or both sides. The coating layer may include a primer layer, a hard coating layer, an antireflective layer, an antifogging coating layer, an antifouling layer and a water repellent layer. These coating layers may be used alone or in multilayer of a plurality of the coating layers. In the case where a coating layer is provided on both sides of the lens, the same coating layer or different coating layer can be provided on each side.

In each of the coating layers, a UV absorber for the purpose of shielding the lens or the eye from ultraviolet rays, an IR absorber for the purpose of shielding the eye from infrared rays, a light stabilizer or an antioxidant for the purpose of improving the weather resistance of the lens, a dye or a pigment for the purpose of enhancing the fashionability of the lens, in addition, a photochromic dye or a photochromic pigment, or an antistatic agent, and other known additives for enhancement of the properties of the lens can be used together. With regard to the coating layer by applying, various leveling agents for improving the coating properties can be contained.

The primer layer is generally formed between the hard coating layer and the optical lens which will be described later. The primer layer is a coating layer provided for the purpose of improving adhesiveness between the hard coating layer formed above the primer layer and the lens, and the impact resistance can be improved according to the circumstances. Any material can be used for the primer layer as far as it has high adhesion to the obtained optical lens. Generally, a primer composition which contains primarily a urethane-based resin, an epoxy-based resin, a polyester-based resin, a melanin-based resin and polyvinyl acetal, or the like is used. For the primer composition, a proper solvent having no influence on the lens may be used for the purpose of adjusting viscosity of the composition. Needless to say, the composition can be used without a solvent.

The primer composition can be used by any of a coating method and a dry method. In the case of employing the coating method, a primer layer is formed by performing coating according to a known method such as spin coating, dip coating, and the like on a lens, followed by solidification. In the case of employing the dry method, the primer layer is formed by a known dry method such as a CVD method, a vacuum deposition method, and the like. When forming the primer layer, the surface of the lens may be subjected to a pretreatment such as alkaline treatment, plasma treatment, ultraviolet treatment, and the like for the purpose of improving adhesion, if needed.

The hard coating layer is a coating layer aimed to provide functions such as scratch resistance, wear resistance, moisture resistance, hot water resistance, heat resistance, weather resistance, and the like to the surface of the lens.

For the hard coating layer, a hard coating composition which includes a curable organosilicon compound, one or more kinds of oxide fine particles of the element selected from the element group consisting of Si, Al, Sn, Sb, Ta, Ce, La, Fe, Zn, W, Zr, In, and Ti and/or one or more kinds of fine particles composed of two or more kinds of composite oxide selected from the group of these elements are normally used.

The hard coating composition preferably includes at least any one of amines, amino acids, metal acetylacetonate complexes, metal salts of an organic acid, perchloric acid, a salt of perchloric acid, acids, metal chlorides, and a polyfunctional epoxy compound in addition to above-mentioned compounds. A proper solvent which does not affect the lens can be used for the hard coating composition. Needless to say, it may be used without a solvent.

The hard coating layer is usually formed by curing after applying the hard coating composition by a known coating method such as spin coating, dip coating, and the like. Examples of the curing method may include thermal curing; curing by irradiation with energy rays such as ultraviolet, visible light, and the like; etc. In order to suppress the generation of interference fringes, a refractive index of the hard coating layer preferably has a difference in the refractive index of the lens in a range of ±0.1 with respect to the lens.

The antireflective layer is normally formed over the above-mentioned hard coating layer, if needed. As the antireflective layer, the layer containing an inorganic compound and an organic compound is used. In the case of the inorganic system the layer is formed by a dry method such as a vacuum deposition method, a sputtering method, an ion plating method, an ion beam assist method, a CVD method, and the like, using an inorganic oxide such as $SiO_2$, $TiO_2$, and the like. In the case of the organic system, the layer is formed by a wet method using a composition including an organosilicon compound and silica-based fine particles having an inner cavity.

The antireflective layer has a single layer and a multilayer. In the case of using the single layer, a refractive index of the antireflective layer falls below preferably at least 0.1 than that of the hard coating layer. A multilayer antireflective layer preferably fulfills an antireflective function effectively; in that case, a coating layer of low refractive index and a coating layer of high refractive index are alternately stacked. The difference of the refractive index between the low refractive index coating and the high refractive index coating is also preferably equal to or more than 0.1. Examples of the high refractive index coating may include coatings such as ZnO, $TiO_2$, $CeO_2$, $Sb_2O_5$, $SnO_2$, $ZrO_2$, $Ta_2O_5$, and the like, and examples of the low refractive index coating layer may include an $SiO_2$ coating and the like.

An antifogging coating layer, an antifouling layer or a water repellent layer can be formed on the antireflective layer if needed. As the method for forming the antifogging coating layer, the antifouling layer and the water repellent layer, a known antifogging coating treatment method, antifouling treatment method, water repellent treatment method and materials can be used without limiting the treatment method, treatment materials or the like as far as they do not adversely affect the antireflective function. Examples of the antifogging coating treatment method and antifouling treatment method may include a method of coating the surface with a surfactant, a method of imparting water absorbability by applying a hydrophilic coating on the surface, a method of enhancing the water absorbability by covering the surface with fine unevenness, a method of imparting water absorbability by utilizing photocatalytic activity, a method of preventing water droplets from adhering by being subjected to a super water-repellent treatment and the like. In addition, the water repellent treatment method may include a method of forming a water repellent-treated layer by depositing or sputtering a fluorine-containing silane compound or the like, a method of coating to form a water repellent-treated layer after dissolving a fluorine-containing silane compound in a solvent, and the like.

The plastic lens using the polythiourethane resin of the present invention may be dyed with the use of a pigment for purposes such as impartation of fashionability, a photochromic property, or the like.

The lens can be dyed by a known dyeing method, but is usually dyed in the following method.

(1) A method of immersing a lens in a dyeing liquid; (2) a method of coating using a coating agent containing a pigment, or a method of producing a dyeable coating layer to dye the coating layer; (3) a method of containing a dyeable material in starting monomers to polymerize; and (4) a method of sublimating a sublimable pigment by heating.

The method (1) is to immerse a lens material finished as a predetermined optical surface in a dyeing liquid in which a pigment to be used is dissolved or uniformly dispersed (dyeing process), thereafter, if needed, to immobilize the pigment by heating the lens (post-dyeing annealing process). The pigment to be used in the dyeing process is not particularly limited as far as it is a known pigment. Normally, oil soluble dyes or disperse dyes are used. The solvent to be used in the dyeing process is not particularly limited as far as the pigment to be used is dissolvable or uniformly dispersible. In this dyeing process, a surfactant for dispersing the pigment in the dyeing liquid or a carrier for promoting dyeing can be added if needed. In the dyeing process, the pigment and the surfactant which are added as needed are dispersed in water or a mixture of water and an organic solvent to produce a dye bath, then an optical lens is immersed in this dye bath, and dyed at a predetermined temperature for a predetermined time. The dyeing temperature and time vary depending on a desired color concentration. Normally, this is at 120° C. or lower for several minutes to several tens of hours, and the dye concentration of the dye bath is 0.01 to 10% by weight. In the case where it is difficult to dye, it may be carried out under pressure. The post-dyeing annealing process as needed is to heat the lens material which was dyed in the dyeing process. The heating treatment is carried out for predetermined time in a furnace such as an infrared heating furnace or a resistance heating furnace in an air atmosphere after water remaining on the surface of the dyed lens material is removed by a solvent or the like, or the solvent remaining on the lens material is dried in the air. The post-dyeing annealing process prevents the dyed lens material from decoloring (decoloring preventive treatment) as well as allowing removal of water which penetrates inside of the lens material when dyeing.

The method (2) is not a way of directly dyeing the plastic lens material. The method employs a method of forming a dyed coating layer on the surface of a lens by applying an organic coating solution in which a pigment is dispersed or dissolved to a plastic lens followed by curing, or a method of dyeing by forming a dyeable coating layer on the surface of a plastic lens and then employing the method (1), in other words, immersing a plastic lens in a dye liquid followed by heating to dye the lens.

The method (3) is a method of polymerizing after dissolving a dye in starting monomers of the plastic lens in advance. The pigment to be used is not particularly limited as far as it is uniformly dissolved or dispersible in the starting monomers to a degree not impairing optical properties.

The method (4) has (a) a method of dyeing a plastic lens by sublimating a solid sublimable pigment; (b) a method of dyeing by facing a base on which a solution including a sublimable pigment is applied, to a plastic lens out of touch, and heating the base and the lens; and (c) a method of dyeing by transferring a transferred layer constituted of a colored layer containing a sublimable pigment and an adhesive layer to a plastic lens and heating; and the optical lens of the present invention can be dyed by any of the above methods. The pigment to be used is not particularly limited as far as it has a sublimation property.

EXAMPLES

Hereinafter, the present invention will be specifically illustrated with reference to Examples. The releasability, the transparency of the resin, and the performance testing of the lens (refractive index, Abbe number, and heat resistance) were evaluated by the following test methods.

Releasability: When releasing a lens from a molding mold, a case where the lens was not released at all or a part of the lens is missing or the molding mold cracks is denoted as "x" (poor releasability), and a case where such a thing did not occur is denoted as "o" (good releasability).

Transparency of resin: The obtained resin was irradiated to a projector in the dark, and the presence of fogging and opaque substances in lenses was checked with the naked eye. A case where no fogging and no opaque substances in lenses were observed is denoted as "o" (presence of transparency), whereas a case where the fogging and opaque substances in lenses were observed is denoted as "x" (absence of transparency).

Refractive index (ne) and Abbe number (ve): The refractive index and the Abbe number were measured at 20° C. using a Pulfrich refractometer.

Heat resistance: A glass transition temperature (Tg) (° C.) was set to be heat resistance in a TMA penetration method (a load of 50 g, a probe tip of 0.5 mmϕ, and a rate of temperature increase of 10° C./min).

Example 1

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 4.0 g of 1-octanol were uniformly mixed to obtain a composition including a phosphoric ester compound with a total alcohol concentration of 4.2% by weight. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 202 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (trade name Viosorb 583, manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. for 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 2

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 0.6 g of 1-octanol were uniformly mixed to obtain a composition including a phosphoric ester compound with a total alcohol concentration of 2.6% by weight. The composition was slowly heated from room temperature, and stirred uniformly for 18 hours while maintaining the inner temperature at 100° C. After completion of the stirring, the inner temperature was cooled to room temperature, and then the composition was released from the reaction flask, thereby obtaining 199 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 3

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 2.0 g of 1-octanol were uniformly mixed to obtain a composition including a phosphoric ester compound with a total alcohol concentration of 3.3% by weight. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 199 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 4

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 10.0 g of 1-octanol were uniformly mixed to obtain a phosphoric ester-containing composition with a total alcohol concentration of 7.0% by weight. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 207 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 5

In a reaction flask equipped with a stirrer, a thermometer, and a Dimroth condenser, 200 g of Zelec UN, trade name manufactured by STEPAN Co., Ltd. which is a phosphoric ester compound (a total alcohol concentration of 1-octanol and 1-decanol of 2.3% by weight) and 40.0 g of 1-octanol were uniformly mixed to obtain a composition including a phosphoric ester compound with a total alcohol concentration of 18.6% by weight. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 238 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 6

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and octanol 4.0 g of 1-octanol were uniformly mixed to obtain a composition including a phosphoric ester compound with a total alcohol concentration of 4.2% by weight. The composition was slowly heated from room temperature, and stirred uniformly for 14 hours while maintaining the inner temperature at 80° C. After completion of the stirring, the inner temperature was cooled to room temperature, and then the composition was released from the reaction flask, thereby obtaining 202 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 7

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 4.0 g of 1-octanol were uniformly mixed to obtain a composition including a phosphoric ester compound with a total alcohol concentration of 4.2% by weight. The composition was slowly heated from room temperature, and stirred uniformly for 10 hours while maintaining the inner temperature at 120° C. After completion of the stirring, the inner temperature was cooled to room temperature, and then the composition was released from the reaction flask, thereby obtaining 202 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-µm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 8

In a reaction flask equipped with a stirrer, a thermometer, and a Dimroth condenser, 200 g of Zelec UN, trade name manufactured by STEPAN Co., Ltd. which is a phosphoric ester compound (a total alcohol concentration of 1-octanol and 1-decanol of 2.3% by weight) and 4.0 g of 1-octanol were uniformly mixed to obtain a composition including a phosphoric ester compound with a total alcohol concentration of 4.2% by weight. The composition was slowly heated from room temperature to the inner temperature, and stirred uniformly for 10 hours while maintaining the inner temperature at 130° C. After completion of the stirring, the inner temperature was cooled to room temperature, and then the composition was released from the reaction flask, thereby obtaining 202 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-µm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 9

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 4.0 g of 1-octanol were uniformly mixed to obtain a composition including a phosphoric ester compound with a total alcohol concentration of 4.2% by weight. The composition was slowly heated from room temperature, and stirred uniformly for 4 hours while maintaining the inner temperature at 140° C. After completion of the stirring, the inner temperature was cooled to room temperature, and then the composition was released from the reaction flask, thereby obtaining 202 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-µm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 10

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight), and 10.0 g of 2-butanol were uniformly mixed to obtain a composition including a phosphoric ester compound with a total alcohol concentration of 7.0% by weight. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 208 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 11

In a reaction flask equipped with a stirrer, a thermometer, and a Dimroth condenser, 200 g of Zelec UN, trade name manufactured by STEPAN Co., Ltd. which is a phosphoric ester compound (a total alcohol concentration of 1-octanol and 1-decanol of 2.3% by weight) and t-butanol 10.0 g of t-butanol were uniformly mixed to obtain a composition including a phosphoric ester compound with a total alcohol concentration of 7.0% by weight. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 208 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 12

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.042 g of the internal mold release agent for an optical material obtained in Example 1 (600 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 13

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.210 g of the internal mold release agent for an optical material obtained in Example 1 (3000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, on, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 1.

Example 14

36.4 g of m-xylylenediisocyanate, 33.6 g of 4-mercaptomethyl-1,8-dimercapto-3,6-dithiaoctane, 0.0105 g of di-n-butyl tin chloride (150 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the internal mold release agent for an optical material obtained in Example 1 (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.665, an Abbe number (ve) of 32, and a heat resistance (Tg) of 89° C., and thus, it was suitable as a transparent resin for optical use. The evaluation results are shown in Table 1.

Example 15

35.4 g of a mixture of 2,5-bis(isocyanatomethyl)-bicyclo[2.2.1]-heptane and 2,6-bis(isocyanatomethyl)-bicyclo[2.2.1]-heptane, 17.9 g of 4-mercaptomethyl-1,8-dimercapto-3,6-dithiaoctane, 16.7 g of pentaerythritol tetrakis(3-mercaptopropionate), 0.035 g of di-n-butyl tin chloride (500 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.084 g of the internal mold release agent for an optical material obtained in Example 1 (1200 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 41, and a heat resistance (Tg) of 118° C., and thus, it was suitable as a transparent resin for optical use. The evaluation results are shown in Table 1.

Example 16

32.6 g of a mixture of 1,3-bis(isocyanatomethyl)cyclohexane and 1,4-bis(isocyanatomethyl)cyclohexane, 19.4 g of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 18.0 g of pentaerythritol tetrakis(3-mercaptopropionate), 0.070 g of di-n-butyl tin chloride (1000 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.140 g of the internal mold release agent for an optical material obtained in Example 1 (2000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.596, an Abbe number (ve) of 40, and a heat resistance (Tg) of 104° C., and thus, it was suitable as a transparent resin for optical use. The evaluation results are shown in Table 1.

Example 17

29.4 g of a mixture of 1,3-bis(isocyanatomethyl)cyclohexane and 1,4-bis(isocyanatomethyl)cyclohexane, 2.8 g of hexamethylenediisocyanate, 19.6 g of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 18.2 g of pentaerythritol tetrakis(3-mercaptopropionate), 0.070 g of di-n-butyl tin chloride (1000 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.140 g of the internal mold release agent for an optical material obtained in Example 1 (2000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.596, an Abbe number (ve) of 40, and a heat resistance (Tg) of 101° C., and thus, it was suitable as a transparent resin for optical use. The evaluation results are shown in Table 1.

Example 18

31.0 g of m-xylylenediisocyanate, 39.0 g of a mixture of 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane, 0.014 g of di-n-butyl tin chloride (200 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.084 g of the internal mold release agent for an optical material obtained in Example 1 (1200 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.695, an Abbe number (ve) of 30, and a heat resistance (Tg) of 100° C., and thus, it was suitable as a transparent resin for optical use. The evaluation results are shown in Table 1.

Comparative Example 1

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of Zelec UN, trade name manufactured by STEPAN Co., Ltd. (a total alcohol concentration of 1-octanol and 1-decanol of 2.3% by weight) (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good, but the obtained resin was found to have fogging, and was thus not useful as a transparent resin for optical use. The evaluation results are shown in Table 1.

Comparative Example 2

According to the technology described in Japanese Laid-open patent publication No. 7-276381, the following procedure was carried out.

Into a reaction flask equipped with a stirrer and a thermometer, 200 g of Zelec UN, trade name manufactured by STEPAN Co., Ltd., which is a phosphoric ester compound (a total alcohol concentration of 1-octanol and 1-decanol of 2.3% by weight) was added. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 198 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good, but the obtained resin was found to have fogging, and was thus not useful as a transparent resin for optical use. The evaluation results are shown in Table 1.

Comparative Example 3

According to the technology described in JP-A-7-276381, the following procedure was carried out.

Into a reaction flask equipped with a stirrer and a thermometer, 200 g of Zelec UN, trade name manufactured by STEPAN Co., Ltd., which is a phosphoric ester compound (a total alcohol concentration of 1-octanol and 1-decanol of 2.3% by weight) was added. The composition was slowly heated from room temperature, and stirred uniformly for 30 hours while maintaining the inner temperature at 100° C. After completion of the stirring, the inner temperature was cooled to room temperature, and then the composition was released from the reaction flask, thereby obtaining 198 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good, but the obtained resin was found to have fogging, and was thus not useful as a transparent resin for optical use. The evaluation results are shown in Table 1.

Comparative Example 4

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 4.0 g of 1-octanol were uniformly mixed to obtain a composition including a phosphoric ester compound with a total alcohol concentration of 4.2% by weight. The composition was slowly heated from room temperature, and stirred uniformly for 30 hours while maintaining the inner temperature at 40° C. After completion of the stirring, the inner temperature was cooled to room temperature, and then the composition was released from the reaction flask, thereby obtaining 203 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good, but the obtained resin was found to have fogging, and was thus not useful as a transparent resin for optical use. The evaluation results are shown in Table 1.

Comparative Example 5

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 4.0 g of 1-octanol were uniformly mixed to obtain a composition including a phosphoric ester compound with a total alcohol concentration of 4.2% by weight. The composition was slowly heated from room temperature, and stirred uniformly for 10 hours while maintaining the inner temperature at 160° C. After completion of the stirring, the inner temperature was cooled to room temperature, and then the composition was released from the reaction flask, thereby obtaining 170 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good, but the obtained resin was found to have fogging, and was thus not useful as a transparent resin for optical use. The evaluation results are shown in Table 1.

TABLE 1

| | Treatment condition | | | | | Polymerizable composition | | | | Physical properties | | | | |
|---|---|---|---|---|---|---|---|---|---|---|---|---|---|---|
| | Alcohol | | Total alcohol concentration (wt %) in acidic phosphoric ester-containing composition | Treatment temperature (°C.) | Treatment time (h) | Amount (parts by weight)* of internal mold release agent added | Weight (g) of isocyanates | Weight (g) of active oxygen compounds | Releasability | Transparency of resin | Refractive index (ne) | Abbe number (ve) | heat resistance (°C.) |
| | included in Zelec UN | Added alcohol | | | | | | | | | | | |
| Example 1 | A-1/A-4 | A-1 | 4.2 | 100 | 10 | 0.1 | N-1 30.5 | S-1 39.5 | ○ | ○ | 1.598 | 36 | 90 |
| Example 2 | A-1/A-4 | A-1 | 2.6 | 100 | 18 | 0.1 | N-1 30.5 | S-1 39.5 | ○ | ○ | 1.598 | 36 | 90 |
| Example 3 | A-1/A-4 | A-1 | 3.3 | 100 | 10 | 0.1 | N-1 30.5 | S-1 39.5 | ○ | ○ | 1.598 | 36 | 90 |
| Example 4 | A-1/A-4 | A-1 | 7.0 | 100 | 10 | 0.1 | N-1 30.5 | S-1 39.5 | ○ | ○ | 1.598 | 36 | 90 |
| Example 5 | A-1/A-4 | A-1 | 18.6 | 100 | 10 | 0.1 | N-1 30.5 | S-1 39.5 | ○ | ○ | 1.598 | 36 | 90 |
| Example 6 | A-1/A-4 | A-1 | 4.2 | 80 | 14 | 0.1 | N-1 30.5 | S-1 39.5 | ○ | ○ | 1.598 | 36 | 90 |
| Example 7 | A-1/A-4 | A-1 | 4.2 | 120 | 10 | 0.1 | N-1 30.5 | S-1 39.5 | ○ | ○ | 1.598 | 36 | 90 |
| Example 8 | A-1/A-4 | A-1 | 4.2 | 130 | 10 | 0.1 | N-1 30.5 | S-1 39.5 | ○ | ○ | 1.598 | 36 | 90 |
| Example 9 | A-1/A-4 | A-1 | 4.2 | 140 | 4 | 0.1 | N-1 30.5 | S-1 39.5 | ○ | ○ | 1.598 | 36 | 90 |
| Example 10 | A-1/A-4 | A-2 | 4.2 | 100 | 10 | 0.1 | N-1 30.5 | S-1 39.5 | ○ | ○ | 1.598 | 36 | 90 |
| Example 11 | A-1/A-4 | A-3 | 7.0 | 100 | 10 | 0.1 | N-1 30.5 | S-1 39.5 | ○ | ○ | 1.598 | 36 | 90 |
| Example 12 | A-1/A-4 | A-1 | 4.2 | 100 | 10 | 0.06 | N-1 30.5 | S-1 39.5 | ○ | ○ | 1.598 | 36 | 90 |
| Example 13 | A-1/A-4 | A-1 | 4.2 | 100 | 10 | 0.3 | N-1 30.5 | S-1 39.5 | ○ | ○ | 1.598 | 36 | 90 |
| Example 14 | A-1/A-4 | A-1 | 4.2 | 100 | 10 | 0.1 | N-1 36.4 | S-2 33.6 | ○ | ○ | 1.598 | 36 | 89 |
| Example 15 | A-1/A-4 | A-1 | 4.2 | 100 | 10 | 0.12 | N-2 35.4 | S-1 16.7 S-2 17.9 | ○ | ○ | 1.665 | 32 | 118 |
| Example 16 | A-1/A-4 | A-1 | 4.2 | 100 | 10 | 0.2 | N-3 32.6 | S-1 18.0 S-3 19.6 | ○ | ○ | 1.598 | 41 | 104 |
| Example 17 | A-1/A-4 | A-1 | 4.2 | 100 | 10 | 0.2 | N-3 29.4 N-4 2.8 | S-1 18.2 S-3 19.6 | ○ | ○ | 1.596 | 40 | 101 |

TABLE 1-continued

| | Alcohol | | Treatment condition | | | | Polymerizable composition | | | | Physical properties | | | |
|---|---|---|---|---|---|---|---|---|---|---|---|---|---|---|
| | included in Zelec UN | Added alcohol | Total alcohol concentration (wt %) in acidic phosphoric ester-containing composition | Treatment temperature (°C.) | Treatment time (h) | Amount (parts by weight)* of internal mold release agent added | Weight (g) of isocyanates | Weight (g) of active oxygen compounds | Releasability | Transparency of resin | Refractive index (ne) | Abbe number (ve) | heat resistance (°C.) |
| Example 18 | A-1/A-4 | A-1 | 4.2 | 100 | 10 | 0.12 | N-1 31.0 | S-4 39.0 | ○ | ○ | 1.695 | 30 | 100 |
| Comparative Example 1 | A-1/A-4 | None | 2.3 | Not treated | | 0.1 | N-1 30.5 | S-1 39.5 | ○ | x | Cannot be measured | Cannot be measured | |
| Comparative Example 2 | A-1/A-4 | None | 2.3 | 100 | 10 | 0.1 | N-1 30.5 | S-1 39.5 | ○ | x | Cannot be measured | Cannot be measured | |
| Comparative Example 3 | A-1/A-4 | None | 2.3 | 100 | 30 | 0.1 | N-1 30.5 | S-1 39.5 | ○ | x | Cannot be measured | Cannot be measured | |
| Comparative Example 4 | A-1/A-4 | A-1 | 4.2 | 40 | 30 | 0.1 | N-1 30.5 | S-1 39.5 | ○ | x | Cannot be measured | Cannot be measured | |
| Comparative Example 5 | A-1/A-4 | A-1 | 4.2 | 160 | 10 | 0.1 | N-1 30.5 | S-1 39.5 | ○ | x | Cannot be measured | Cannot be measured | |

Each of the symbols in Table 1 represents the following meaning.
A-1: 1-octanol
A-2: 2-butanol
A-3: t-butanol
A-4: 1-decanol
N-1: m-xylylenediisocyanate
N-2: mixture of 2,5-bis(isocyanatomethyl)-bicyclo[2.2.1]-heptane and 2,6-bis(isocyanatomethyl)-bicyclo[2.2.1]-heptane
N-3: mixture of 1,3-bis(isocyanatomethyl)cyclohexane and 1,4-bis(isocyanatomethyl)cyclohexane
N-4: hexamethylenediisocyanate
S-1: pentaerythritol tetrakis(3-mercaptopropionate)
S-2: 4-mercaptomethyl-1,8-dimercapto-3,6-dithiaoctane
S-3: mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane
S-4: mixture of 1,1,3,3-tetrakis(mercaptomethylthio)propane, 4,6-bis(mercaptomethylthio)-1,3-dithiane, and 2-(2,2-bis(mercaptodimethylthio)ethyl)-1,3-dithietane
*content based on 100 parts by weight of the total amount of iso(thio)cyanates and active hydrogen compounds

Example 19

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 9.0 g of 1-octanol were uniformly mixed to obtain a composition including a phosphoric ester compound with a total alcohol concentration of 6.5% by weight. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 207 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Example 20

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 9.0 g of 1-octanol were uniformly mixed to obtain a composition including a phosphoric ester compound with a total alcohol concentration of 6.5% by weight. The composition was slowly heated from room temperature, and stirred uniformly for 14 hours while maintaining the inner temperature at 80° C. After completion of the stirring, the inner temperature was cooled to room temperature, and then the composition was released from the reaction flask, thereby obtaining 207 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Example 21

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 9.0 g of 1-octanol were uniformly mixed to obtain a composition including a phosphoric ester compound with a total alcohol concentration of 6.5% by weight. The composition was slowly heated from room temperature, and stirred uniformly for 10 hours while maintaining the inner temperature at 120° C. After completion of the stirring, the inner temperature was cooled to room temperature, and then the composition was released from the reaction flask, thereby obtaining 207 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Example 22

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 9.0 g of 1-octanol were uniformly mixed to obtain a composition including a phosphoric ester compound with a total alcohol concentration of 6.5% by weight. The composition was slowly heated from room temperature to the inner temperature, and stirred uniformly for 10 hours while maintaining the inner temperature at 130° C. After completion of the stirring, the inner temperature was cooled to room temperature, and then the composition was released from the reaction flask, thereby obtaining 207 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Example 23

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 9.0 g of 1-octanol were uniformly mixed to obtain a composition including a phosphoric ester compound with a total alcohol concentration of 6.5% by weight. The composition was slowly heated from room temperature, and stirred uniformly for 4 hours while maintaining the inner temperature at 140° C. After completion of the stirring, the inner temperature was cooled to room temperature, and then the composition was released from the reaction flask, thereby obtaining 207 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Example 24

In a reaction flask equipped with a stirrer, a thermometer, and a Dimroth condenser, 200 g of Zelec UN, trade name manufactured by STEPAN Co., Ltd. which is a phosphoric ester compound (a total alcohol concentration of 1-octanol and 1-decanol of 2.3% by weight) and 9.0 g of 2-butanol were uniformly mixed to obtain a composition including a phosphoric ester compound with a total alcohol concentration of 6.5% by weight. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 207 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Example 25

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 9.0 g of t-butanol were uniformly mixed to obtain a composition including a phosphoric ester compound with a total alcohol concentration of 6.5% by weight. The composition was slowly heated from room temperature, and stirred uniformly for 14 hours while maintaining the inner temperature at 80° C. After completion of the stirring, the inner temperature was cooled to room temperature, and then the composition was released from the reaction flask, thereby obtaining 207 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Example 26

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.042 g of the internal mold release agent for an optical material obtained in Example 19 (600 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Example 27

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.21 g of the obtained internal mold release agent for an optical material obtained in Example 19 (3000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Example 28

36.4 g of m-xylylenediisocyanate, 33.6 g of 4-mercaptomethyl-1,8-dimercapto-3,6-dithiaoctane, 0.0056 g of di-n-butyl tin chloride (80 ppm based on the total weight of the polymerizable composition), 0.070 g of an ultraviolet absorber (Viosorb 583, trade name manufactured by Kyodo Yakuhin Co., Ltd.) (1000 ppm based on the total weight of the polymerizable composition), and 0.070 g of the internal mold release agent for an optical material obtained in Example 19 (1000 ppm based on the total weight of the polymerizable composition) were mixed and dissolved at 20° C. to give a uniform solution. This mixed solution was degassed at 400 Pa for one hour, filtered by passing it through a 1-μm PTFE-made and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.665, an Abbe number (ve) of 32, and a heat resistance (Tg) of 89° C., and thus, it was suitable as a transparent resin for optical use. The evaluation results are shown in Table 2.

Example 29

35.4 g of a mixture of 2,5-bis(isocyanatomethyl)-bicyclo[2.2.1]-heptane and 2,6-bis(isocyanatomethyl)-bicyclo[2.2.1]-heptane, 17.9 g of 4-mercaptomethyl-1,8-dimercapto-3,6-dithiaoctane, 16.7 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.084 g of the internal mold release agent for an optical material obtained in Example 19 (1200 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 41, and a heat resistance (Tg) of 118° C., and thus, it was suitable as a transparent resin for optical use. The evaluation results are shown in Table 2.

Example 30

32.6 g of a mixture of 1,3-bis(isocyanatomethyl)cyclohexane and 1,4-bis(isocyanatomethyl)cyclohexane, 19.4 g of a mixture of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane, 18.0 g of pentaerythritol tetrakis (3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.14 g of the internal mold release agent for an optical material obtained in Example 19 (2000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.596, an Abbe number (ve) of 40, and a heat resistance (Tg) of 104° C. and thus, it was suitable as a transparent resin for optical use. The evaluation results are shown in Table 2.

Example 31

29.4 g of a mixture of 1,3-bis(isocyanatomethyl)cyclohexane and 1,4-bis(isocyanatomethyl)cyclohexane, 2.8 g of hexamethylenediisocyanate, 19.6 q of a mixture of 5,7-dimercaptomethyl-1,11-dimercapto-3,6,9-trithiaundeca 4,7-dimercaptomethyl-1,11-dimercapto-3,6,9-trithiaundecane and 4,8-dimercaptomethyl-1,11-dimercapto-3,6,9-trithiaundecane, 18.2 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), 0.14 g of the internal mold release agent for an optical material obtained in Example 19 (2000 ppm based on the total weight of the polymerizable composition) were mixed and dissolved at 20° C. to give a uniform solution. This mixed solution was degassed at 400 Pa for one hour, filtered by passing it through a 1-μm PTFE-made and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.596, an Abbe number (ve) of 40, and a heat resistance (Tg) of 101° C., and thus, it was suitable as a transparent resin for optical use. The evaluation results are shown in Table 2.

Example 32

31.0 g of m-xylylenediisocyanate, 39.0 g of a mixture of 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane, 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.084 g of the internal mold release agent for an optical material obtained in Example 19 (1200 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.695, an Abbe number (ve) of 30, and a heat resistance (Tg) of 100° C., and thus, it was suitable as a transparent resin for optical use. The evaluation results are shown in Table 2.

Example 33

In a reaction flask equipped with a stirrer, a thermometer, and a Dimroth condenser, 200 g of Zelec UN, trade name manufactured by STEPAN Co., Ltd. which is a phosphoric ester compound (a total alcohol concentration of 1-octanol and 1-decanol of 2.3% by weight) and 190.8 g of 1-octanol were uniformly mixed to obtain a composition including a phosphoric ester compound with a total alcohol concentration of 50% by weight. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 395 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.084 g of the obtained internal mold release agent for an optical material (1200 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Example 34

In a reaction flask equipped with a stirrer, a thermometer, and a Dimroth condenser, 200 g of Zelec UN, trade name manufactured by STEPAN Co., Ltd. which is a phosphoric ester compound (a total alcohol concentration of 1-octanol and 1-decanol of 2.3% by weight) and 581.6 g of 1-octanol were uniformly mixed to obtain a composition including a phosphoric ester compound with a total alcohol concentration of 75% by weight. The composition was slowly heated from room temperature, and stirred uniformly for 10 hours while maintaining the inner temperature at 100° C. After completion of the stirring, the inner temperature was cooled to room temperature, and then the composition was released from the reaction flask, thereby obtaining 774 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.168 g of the obtained internal mold release agent for an optical material (2400 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good. The obtained resin was further subjected to an annealing treatment at 130° C. for 4 hours. The obtained resin had transparency as well as a refractive index (ne) of 1.598, an Abbe number (ve) of 36, and a heat resistance (Tg) of 90° C., and thus, it was suitable as a transparent resin for optical use. The evaluation results are shown in Table 2.

Comparative Example 6

In a reaction flask equipped with a stirrer, a thermometer, and a Dimroth condenser, 200 g of Zelec UN, trade name manufactured by STEPAN Co., Ltd. which is a phosphoric ester compound (a total alcohol concentration of 1-octanol and 1-decanol of 2.3% by weight) and 9.0 g of 1-octanol were uniformly mixed to obtain a composition including a phosphoric ester compound with a total alcohol concentration of 6.5% by weight. The composition was slowly heated from room temperature, and stirred uniformly for 30 hours while maintaining the inner temperature at 40° C. After completion of the stirring, the inner temperature was cooled to room temperature, and then the composition was released from the reaction flask, thereby obtaining 207 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 q of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good, but the obtained resin was found to have fogging, and was thus not useful as a transparent resin for optical use. The evaluation results are shown in Table 2.

Comparative Example 7

In a reaction flask equipped with a stirrer, a thermometer, and a Dimroth condenser, 200 g of Zelec UN, trade name manufactured by STEPAN Co., Ltd., which is a phosphoric ester compound (a total alcohol concentration of 1-octanol and 1-decanol of 2.3% by weight) and 9.0 g of 1-octanol were uniformly mixed to obtain a composition including a phosphoric ester compound with a total alcohol concentration of 6.5% by weight. The composition was slowly heated from room temperature, and stirred uniformly for 10 hours while maintaining the inner temperature at 150° C. After completion of the stirring, the inner temperature was cooled to room temperature, and then the composition was released from the reaction flask, thereby obtaining 207 g of an internal mold release agent for an optical material.

30.5 g of m-xylylenediisocyanate, 39.5 g of pentaerythritol tetrakis(3-mercaptopropionate), 0.0056 g of di-n-butyl tin chloride (80 ppm based on the total weight of the polymerizable composition), 0.035 g of an ultraviolet absorber (Viosorb 583, trade name manufactured by Kyodo Yakuhin Co., Ltd., 500 ppm based on the total weight of the polymerizable composition), and 0.070 g of the obtained internal mold release agent for an optical material (1000 ppm based on the total weight of the polymerizable composition) were mixed and dissolved at 20° C. to give a uniform solution. This mixed solution was degassed at 400 Pa for one hour, filtered by passing it through a 1-μm PTFE-made filter, and then injected to a mold composed of a glass mold and a tape. This mold was put into a polymerization oven, and slowly heated from 25° C. to 120° C. over 21 hours to perform polymerization. After completion of the polymerization, the mold was taken out from the oven. The releasability of the resin from the mold was good, but the obtained resin was found to have fogging, and was thus not useful as a transparent resin for optical use. The evaluation results are shown in Table 2.

TABLE 2

| Example | Treatment condition | | | | | | Polymerizable composition | | | Physical properties | | | | |
|---|---|---|---|---|---|---|---|---|---|---|---|---|---|---|
| | Alcohol included in Zelec UN | Added alcohol | Total alcohol concentration (wt %) in acidic phosphoric ester-containing composition | Treatment temperature (°C.) | Treatment time (h) | Amount (parts by weight)* of internal mold release agent added | Weight (g) of isocyanates | Weight (g) of active oxygen compounds | Releasability | Transparency of resin | Refractive index (ne) | Abbe number (ve) | heat resistance (°C.) |
| Example 19 | A-1/A-4 | A-1 | 6.5 | 100 | 10 | 0.1 | N-1 30.5 | S-1 39.5 | ○ | ○ | 1.598 | 36 | 90 |
| Example 20 | A-1/A-4 | A-1 | 6.5 | 80 | 14 | 0.1 | N-1 30.5 | S-1 39.5 | ○ | ○ | 1.598 | 36 | 90 |
| Example 21 | A-1/A-4 | A-1 | 6.5 | 120 | 10 | 0.1 | N-1 30.5 | S-1 39.5 | ○ | ○ | 1.598 | 36 | 90 |
| Example 22 | A-1/A-4 | A-1 | 6.5 | 130 | 10 | 0.1 | N-1 30.5 | S-1 39.5 | ○ | ○ | 1.598 | 36 | 90 |
| Example 23 | A-1/A-4 | A-2 | 6.5 | 140 | 4 | 0.1 | N-1 30.5 | S-1 39.5 | ○ | ○ | 1.598 | 36 | 90 |
| Example 24 | A-1/A-4 | A-3 | 6.5 | 100 | 10 | 0.1 | N-1 30.5 | S-1 39.5 | ○ | ○ | 1.598 | 36 | 90 |
| Example 25 | A-1/A-4 | A-1 | 6.5 | 80 | 14 | 0.1 | N-1 30.5 | S-1 39.5 | ○ | ○ | 1.598 | 36 | 90 |
| Example 26 | A-1/A-4 | A-1 | 6.5 | 100 | 10 | 0.06 | N-1 30.5 | S-1 39.5 | ○ | ○ | 1.598 | 36 | 90 |
| Example 27 | A-1/A-4 | A-1 | 6.5 | 100 | 10 | 0.3 | N-1 30.5 | S-1 39.5 | ○ | ○ | 1.598 | 36 | 89 |
| Example 28 | A-1/A-4 | A-1 | 6.5 | 100 | 10 | 0.1 | N-1 36.4 | S-2 33.6 | ○ | ○ | 1.665 | 32 | 118 |
| Example 29 | A-1/A-4 | A-1 | 6.5 | 100 | 10 | 0.12 | N-2 35.4 | S-1 16.7 S-2 17.9 | ○ | ○ | 1.598 | 41 | 104 |
| Example 30 | A-1/A-4 | A-1 | 6.5 | 100 | 10 | 0.2 | N-3 32.6 | S-1 18.0 S-3 19.4 | ○ | ○ | 1.596 | 40 | 101 |
| Example 31 | A-1/A-4 | A-1 | 6.5 | 100 | 10 | 0.2 | N-3 29.4 N-4 2.8 | S-1 18.2 S-3 19.6 | ○ | ○ | 1.596 | 40 | 100 |
| Example 32 | A-1/A-4 | A-1 | 6.5 | 100 | 10 | 0.12 | N-1 31.0 | S-4 39.0 | ○ | ○ | 1.695 | 30 | 90 |
| Example 33 | A-1/A-4 | A-1 | 50.0 | 100 | 10 | 0.12 | N-1 30.5 | S-1 39.5 | ○ | ○ | 1.598 | 36 | 90 |
| Example 34 | A-1/A-4 | A-1 | 75.0 | 100 | 10 | 0.24 | N-1 30.5 | S-1 39.5 | ○ | ○ | 1.598 | 36 | 90 |

TABLE 2-continued

| Example | Treatment condition | | | | | Polymerizable composition | | | Physical properties | | | | |
|---|---|---|---|---|---|---|---|---|---|---|---|---|---|
| | Alcohol included in Zelec UN | Added alcohol | Total alcohol concentration (wt %) in acidic phosphoric ester-containing composition | Treatment temperature (° C.) | Treatment time (h) | Amount (parts by weight)* of internal mold release agent added | Weight (g) of isocyanates | Weight (g) of active oxygen compounds | Releasability | Transparency of resin | Refractive index (ne) | Abbe number (ve) | heat resistance (° C.) |
| Comparative Example 6 | A-1/A-4 | A-1 | 6.5 | 40 | 30 | 0.1 | N-1 30.5 | S-1 39.5 | ○ | x | Cannot be measured | | |
| Comparative Example 7 | A-1/A-4 | A-1 | 6.5 | 150 | 10 | 0.1 | N-1 30.5 | S-1 39.5 | ○ | x | Cannot be measured | | |

In Table 2, the meaning of each of the symbols is the same as in Table 1.

In the present invention, from the results of Example 1, Comparative Example 2, and Comparative Example 3, an internal mold release agent for an optical material having excellent releasability as well as an excellent white turbidity inhibiting effect can be obtained, as compared with the technology described in JP-A-7-276381. Further, from the results of Examples, it was confirmed that the internal mold release agent of the present invention obtained by adjusting the concentration of the alcohol compound to a predetermined range, and heating the resultant to a predetermined temperature is suitable as an optical material.

Industrial Applicability

By using internal mold release agent for an optical material obtained by the production method of the present invention, excellent releasability as well as improved transparency of the cured resin can be attained.

Such an internal mold release agent for an optical material can be used in a polythiourethane resin that is highly suitable as a resin for an optical material, for which a high refractive index and high transparency are required.

The present application claims priority based on Japanese Patent Application No. 2009-255307 filed on Nov. 6, 2009, the entire contents of which are incorporated herein by reference.

That is, the present application includes the following aspects of the invention.

[1] A process for producing an internal mold release agent for an optical material, including:
a step of heating a composition comprising (a) a phosphoric ester compound and (b) an alcohol compound containing an aliphatic alcohol having 1 to 10 carbon atoms and/or aromatic alcohol to a range of 80° C. to 140° C.,
wherein the composition contains the alcohol compound (b) in a range of 2.5 to 30% by weight based on the total amount of (a) and (b) is 100% by weight.

[2] The process for producing an internal mold release agent for an optical material described in [1], further comprising a step of producing the composition before the heating step.

[3] The process for producing an internal mold release agent for an optical material as described in [1] or [2], wherein in the step of producing the composition, the alcohol compound (b) is added to the phosphoric ester compound (a).

[4] The process for producing an internal mold release agent for an optical material as described in any one of [1] to [3], wherein the alcohol compound (b) is an aliphatic alcohol having 4 to 10 carbon atoms.

[5] An internal mold release agent for an optical material obtained by the production method as described in any one of [1] to [4].

[6] A polythiourethane-based polymerizable composition including 0.05 to 0.4 parts by weight of the internal mold release agent for an optical material as described in [5], based on 100 parts by weight of the total amount of the iso(thio) cyanates and the active hydrogen compounds.

[7] The polythiourethane-based polymerizable composition as described in [6], wherein the ratio of the number of the functional groups composed of the mercapto groups and the hydroxyl groups in the active hydrogen compounds to the number of the functional groups composed of the isocyanate groups and the iso(thio)cyanate groups in the isothiocyanates is in the range of 0.8 to 1.2.

[8] The polythiourethane-based polymerizable composition as described in [6] or [7], wherein
the iso(thio)cyanates are one or more kinds of the compound(s) selected from m-xylylenediisocyanate, m-phenylenediisocyanate, 2,4-tolylenediisocyanate, 2,6-tolylenediisocyanate, 2,5-bis(isocyanatomethyl)-bicyclo[2.2.1]-heptane, 2,6-bis(isocyanatomethyl)-bicyclo[2.2.1]-heptane, 1,3-bis(isocyanatomethyl)cyclohexane, 1,4-bis(isocyanatomethyl)cyclohexane, and hexamethylenediisocyanate, and
the active hydrogen compounds are one or more kinds of the compound(s) selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 2,5-dimercaptomethyl-1,4-dithiane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane.

[9] A polythiourethane resin obtained by heating and curing the polymerizable composition as described in any one of [6] to [8].

[10] An optical material including the polythiourethane resin as described in [9].

[11] A plastic lens including the optical material as described in [10].

[12] A process for producing the polythiourethane resin, including subjecting the polymerizable composition as described in any one of [6] to [8] to cast polymerization.

The invention claimed is:
1. A process for producing an internal mold release agent for a polythiourethane-based optical material, comprising:
a step of heating a composition comprising (a) a phosphoric ester compound and (b) an aliphatic alcohol having 1 to 10 carbon atoms to a range of 80° C. to 140° C.,
wherein the composition contains the aliphatic alcohol having 1 to 10 carbon atoms (b) in an amount equal to or more than 2.5% by weight based on the total amount of (a) and (b) is 100% by weight.

2. The process for producing an internal mold release agent for a polythiourethane-based optical material according to claim 1, further comprising a step of producing the composition before the heating step.

3. The process for producing an internal mold release agent for a polythiourethane-based optical material according to claim 2, wherein in the step of producing the composition, the aliphatic alcohol having 1 to 10 carbon atoms (b) is added to the phosphoric ester compound (a).

4. A process for producing an internal mold release agent for a polythiourethane-based optical material comprising:
a step of producing a composition comprising (a) a phosphoric ester compound and (b) an aliphatic alcohol having 1 to 10 carbon atoms, in which the aliphatic alcohol having 1 to 10 carbon atoms (b) is included in an amount equal to or more than 2.5% by weight based on the total amount of (a) and (b) is 100% by weight, and
a step of heating the composition to a range of 80° C. to 140° C.

5. An internal mold release agent for a polythiourethane-based optical material obtained by the production method according to claim 1.

6. A polythiourethane-based polymerizable composition comprising 0.05 to 0.4 parts by weight of the internal mold release agent for an optical material according to claim 5, based on 100 parts by weight of the total amount of the iso(thio)cyanates and the active hydrogen compounds.

7. The polythiourethane-based polymerizable composition according to claim 6, wherein the ratio of the number of the functional groups composed of the mercapto groups and the hydroxyl groups in the active hydrogen compounds to the number of the functional groups composed of the isocyanate groups and the iso(thio)cyanate groups in the isothiocyanates is in the range of 0.8 to 1.2.

8. The polythiourethane-based polymerizable composition according to claim 6, wherein the iso(thio)cyanates are one or more kinds of the compound(s) selected from the group consisting of m-xylylenediisocyanate, m-phenylenediisocyanate, 2,4-tolylenediisocyanate, 2,6-tolylenediisocyanate, 2,5-bis(isocyanatomethyl)-bicyclo[2.2.1]-heptane, 2,6-bis(isocyanatomethyl)-bicyclo[2.2.1]-heptane, 1,3-bis(isocyanatomethyl)cyclohexane, 1,4-bis(isocyanatomethyl)cyclohexane, and hexamethylenediisocyanate, and the active hydrogen compounds are one or more kinds of the compound(s) selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 2,5-dimercaptomethyl-1,4-dithiane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane.

9. A molded product comprising a polythiourethane resin obtained by heating and curing the polymerizable composition according to claim 6.

10. An optical material comprising the molded product according to claim 9.

11. A plastic lens comprising the optical material according to claim 10.

12. A process for producing the polythiourethane resin, comprising subjecting the polymerizable composition according to claim 6 to cast polymerization.

13. An internal mold release agent for a polythiourethane-based optical material obtained by the production method according to claim 4.

14. A polythiourethane-based polymerizable composition comprising 0.05 to 0.4 parts by weight of the internal mold release agent for an optical material according to claim 13, based on 100 parts by weight of the total amount of the iso(thio)cyanates and the active hydrogen compounds.

15. The polythiourethane-based polymerizable composition according to claim 14, wherein the ratio of the number of the functional groups composed of the mercapto groups and the hydroxyl groups in the active hydrogen compounds to the number of the functional groups composed of the isocyanate groups and the iso(thio)cyanate groups in the isothiocyanates is in the range of 0.8 to 1.2.

16. The polythiourethane-based polymerizable composition according to claim 14, wherein the iso(thio)cyanates are one or more kinds of the compound(s) selected from the group consisting of m-xylylenediisocyanate, m-phenylenediisocyanate, 2,4-tolylenediisocyanate, 2,6-tolylenediisocyanate, 2,5-bis(isocyanatomethyl)-bicyclo[2.2.1]-heptane, 2,6-bis(isocyanatomethyl)-bicyclo[2.2.1]-heptane, 1,3-bis(isocyanatomethyl)cyclohexane, 1,4-bis(isocyanatomethyl)cyclohexane, and hexamethylenediisocyanate, and the active hydrogen compounds are one or more kinds of the compound(s) selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 2,5-dimercaptomethyl-1,4-dithiane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane.

17. A molded product comprising a polythiourethane resin obtained by heating and curing the polymerizable composition according to claim 14.

18. An optical material comprising the molded product according to claim 17.

19. A plastic lens comprising the optical material according to claim 18.

20. A process for producing the polythiourethane resin, comprising subjecting the polymerizable composition according to claim 14 to cast polymerization.

* * * * *